United States Patent [19]

Kato et al.

[11] Patent Number: 5,571,569

[45] Date of Patent: Nov. 5, 1996

[54] THIN-FILM FORMING METHOD

[75] Inventors: Yoshifumi Kato; Yoshifumi Fujita; Atsushi Hozumi; Akiteru Nishio, all of Kariya, Japan

[73] Assignee: Kabushiki Kaisha Toyoda Jidoshokki Seisakusho, Kariya, Japan

[21] Appl. No.: 420,209

[22] Filed: Apr. 11, 1995

[30] Foreign Application Priority Data

Apr. 14, 1994 [JP] Japan .................................. 6-076179
Nov. 18, 1994 [JP] Japan .................................. 6-285616
Dec. 20, 1994 [JP] Japan .................................. 6-316773

[51] Int. Cl.$^6$ ............................... B05D 3/02; B05D 3/06
[52] U.S. Cl. ..................... 427/493; 427/495; 427/498; 427/512; 427/387
[58] Field of Search ............................ 427/493, 495, 427/498, 512, 387

[56] References Cited

U.S. PATENT DOCUMENTS

| | | | |
|---|---|---|---|
| 3,935,346 | 1/1976 | Stengle et al. | 427/385 |
| 4,084,021 | 4/1978 | Sandvig | 427/44 |
| 4,246,298 | 1/1981 | Guarnery et al. | 427/46 |
| 4,758,448 | 7/1988 | Sandvig et al. | 427/493 |

FOREIGN PATENT DOCUMENTS

| | | |
|---|---|---|
| 3227463 | 8/1991 | Japan . |
| 4076059 | 3/1992 | Japan . |
| 476059 | 10/1992 | Japan . |

OTHER PUBLICATIONS

Translation Of JP04–076059, Mar. 10, 1992.

*Primary Examiner*—Michael Lusignan
*Assistant Examiner*—Erma Cameron
*Attorney, Agent, or Firm*—Brooks Haidt Haffner & Delahunty

[57] ABSTRACT

A thin-film forming method comprising an uncured-layer forming step in which a mixed composition containing an organic polymerizing agent curable composition and a silicone polymerizing curable composition is prepared to form an uncured layer consisting of this mixed composition on a resin substrate; a solvent removing step in which the solvent in the uncured layer is removed; a first polymerization curing step in which the organic polymerizing curable composition in the uncured layer is polymerized; and a second polymerization curing step in which the silicone polymerizing curable composition in the uncured layer is polymerized. The thin-film forming method can comprise formation of the uncured layer on a resin substrate through the intermediation of a primer layer or formation of an uncured underlayer and uncured top layer followed by separate underlayer polymerization and top layer polymerization curing steps. The methods are applicable to the production of abrasion-resistant and water-repellent resin glass for automobiles.

8 Claims, 12 Drawing Sheets

R : ALKYL GROUP

R : ALKYL GROUP

○ : EXAMPLES 8 AND 9
□ : EXAMPLES 11 AND 12

THIN-FILM FORMING METHOD

BACKGROUND OF THE INVENTION

1. Field of the Invention

This invention relates to a method for forming a thin film having abrasion resistance and water repellency mainly on the surface of a resin product, and, in particular, to a method of forming an abrasion-resistant and water-repellent thin film on the surface of a transparent resin glass.

2. Description of the Related Art

The windowpanes of automobiles, etc. are generally formed of inorganic glass products. Recently, however, use of transparent resin products, which are lightweight and have excellent workability, in place of inorganic glass products, has been proposed. Further, the use of resin products, which have excellent formability, instead of metal products, has been proposed for such mechanical components as gears. However, resin products are inferior to inorganic glass products and metal products in abrasion resistance, and so there are limitations in their use. In view of this, various thin-film forming methods for forming an abrasion-resistant thin film on the surface of a resin product have been considered.

For example, in a known method, an uncured layer consisting of a methacrylic or acrylic-type UV-polymerizing curable coating is formed on a clean resin substrate, and irradiated with UV (ultraviolet rays) to effect polymerization, thereby forming a cured thin film. This method is convenient in that the resin substrate and the methacrylic or acrylic-type UV-polymerizing curable coating firmly adhere to each other, so that it is possible to form a thin film on various resin substrates without providing a primer layer therebetween. However, the above thin-film forming method has a problem in that the thin film formed does not have a sufficient degree of abrasion resistance since commercially curable compositions that are capable of forming a thin film having a sufficient degree of hardness are not yet available.

In another known thin-film forming method, a silicone-type thermally polymerizing curable coating, which is a typical thermally polymerizing curable coating, is used. According to the known method, a primer layer for achieving an improvement in adhesion is applied to a resin substrate, and, after curing this layer by drying, an uncured layer consisting of a silicone-type thermally polymerizing curable coating is formed on the primer layer. Next, the coating is thermally cured by a heating process. In this known method, a thin film is formed of a silicone-type thermally polymerizing curable coating, so that a large amount of silicon oxide exists on the surface, thereby providing excellent abrasion resistance. However, since a primer layer has to be provided between the thin film and the substrate in order to improve the adhesion of the thin film, an increase in the number of processes is entailed. In particular, when the resin substrate is formed of an engineering plastic like polycarbonate, it is impossible for the thin film to adhere without providing a primer layer therebetween.

When using a transparent resin plate as an automotive windowpane, it is desirable that the plate exhibit water repellency in addition to abrasion resistance.

From the viewpoint of water repellency only, it is possible for to ensure a contact angle of 75 between the resin plate and water if the resin substrate is formed of PC (polycarbonate) due to the hydrophobic property of the substrate itself. However, a contact angle of this degree is not sufficient to provide the requisite water repellency. Thus, when used as an automotive windowpane or the like, it is difficult for this resin substrate to ensure satisfactory visibility in rainy weather or the like. Further, this resin substrate does not satisfy the requirements in terms of abrasion resistance. Also, when the above commercial water-repellent agent is simply applied to the resin substrate, the resultant water-repellent layer is rather poor in terms of abrasion resistance.

When a thin film consisting of an acrylic curable coating is formed on a resin substrate as described above, the contact angle it makes with water is approximately 60° due to the hydrophobic property of the acrylic groups, so that it is possible to obtain some degree of water repellency. However, a contact angle of this degree cannot be regarded as sufficient. Further, the thin film does not provide satisfactory abrasion resistance.

Similarly, in the case of a thin film consisting of a silicone-type curable coating formed on a resin substrate through the intermediation of a primer layer, the contact angle the thin film makes with water is increased to approximately 82° due to the influence of the $Si(CH_3)$ bond, leveling agent, etc., thus providing water repellency to some degree. Further, due to the structure of $SiO_{2-x}$ ($x=0.6-0.7$), it is possible to obtain a measure of abrasion resistance. However, a contact angle of this degree is still insufficient to provide the requisite water repellency. In particular, the surface-active agent, leveling agent, etc. degenerate as a result of exposure to ultraviolet rays or the like during use, thereby rendering it impossible for the thin film to reliably provide a sufficient degree of water repellency.

Distinct from the above, a method has been developed according to which a water-repellent and abrasion-resistant thin film consisting of $SiO_2$ containing fluorine is formed by the sol-gel method on an inorganic glass plate generally used for automotive windowpanes (see, for example, "Preliminary Reports of Annual Lectures", Ceramic Society of Japan, Vol. 199 1, page 96, or "Journal of Non-Crystalline Solids 121 (990) 344–347 North-Holland").

It might be possible to apply this sol-gel method to a resin plate, forming a water-repellent and abrasion-resistant thin film on the resin plate. However, as stated in the above-mentioned publications, if the sol-gel method is utilized as is, due to the heating temperature the fluorine contained in the thin film will evaporate resulting in a deterioration of water repellency.

Further, if the above sol-gel method is applied as it is to the resin substrate, as the water-repellent and abrasion resistant thin film is formed directly on the resin substrate, the water-repellent and abrasion resistant thin film does not firmly adhere to the resin substrate. Therefore, the resultant water-repellent and abrasion-resistant thin film is apt to exfoliate through long-term use, etc.

Also in the case of the acrylic-type cured coating formed on the resin substrate and the thin film of silicone-type cured coating formed on the resin substrate through the intermediation of a primer layer, the adhesion between the resin substrate and the acrylic-type cured coating and the adhesion between the resin substrate and the thin film of silicone-type cured coating formed thereon through the intermediation of a primer layer are rather poor and subject to exfoliation as in the above case. This is particularly true of the case in which the thin film is made of a silicone-type curable coating, which has a structure expressed as $SiO_{2-x}$ ($x=0.6-0.7$), that is, a structure which is different from the $SiO_2$ structure of inorganic glass, so that the thin film is liable to be infiltrated by water and thereby swell. Thus, even if a silicone-type curable coating is applied to an acrylic-type curable coating, the resultant thin film is apt to exfoliate after being subjected to a hot-water test.

It is an object of the present invention to make it possible to easily form a thin film which has excellent abrasion resistance and excellent adhesiveness and which reliably exhibits water repellency on a resin substrate.

After careful examination on how to achieve this object, the present inventors have found that, by applying a mixed composition containing an organic-type polymerizing curable composition and a mixture containing silicone-type polymerizing curable composition and, as needed, a silane coupling agent, to a resin substrate and curing it thereon, it is possible to form a thin film which excels in abrasion resistance and water repellency, thus completing the present invention.

SUMMARY OF THE INVENTION

In an aspect of the present invention, there is provided a thin-film forming method comprising:

an uncured-layer forming step in which a mixed composition containing an organic-type polymerizing curable composition and a silicone-type polymerizing curable composition is prepared to form an uncured layer consisting of this mixed composition on a resin substrate;

a solvent removing step in which the solvent in the uncured layer is removed;

a first polymerization curing step in which the organic-type polymerizing curable composition in the uncured layer is polymerized; and a second polymerization curing step in which the silicone-type polymerizing curable composition in the uncured layer is polymerized.

According to another aspect of the present invention, there is provided a thin-film forming method wherein a mixed composition further containing a silane coupling agent having at least one of the following kinds of organic-type functional groups; methacrylic group, acrylic group, epoxy group, amino group and vinyl group; a silane coupling agent having a fluoroalkyl group; or a silane coupling agent having a long-chain alkyl group, is used as the above-mentioned mixed composition.

In still another aspect of the present invention, there is provided a water-repellent and abrasion-resistant thin-film forming method comprising:

an uncured-layer forming step in which a mixed composition containing an organic-type polymerizing curable composition, a silicone-type abrasion-resistant thermally polymerizing curable composition and a silane coupling agent having a fluoro-alkyl group or a long-chain alkyl group is prepared to form an uncured layer consisting of this mixed composition on a resin substrate;

a solvent removing step in which the solvent in the uncured layer is removed;

a first polymerization curing step in which the organic-type polymerizing curable composition in the uncured layer is polymerized by irradiation with light or an electron beam; and a second polymerization curing step in which the silicone-type abrasion-resistant thermally polymerizing curable composition in the uncured layer is polymerized by heating.

In a further aspect of the present invention, there is provided a water-repellent and abrasion-resistant thin-film forming method comprising:

an uncured-layer forming step in which a mixed composition containing an organic-type polymerizing curable composition and a silicone-type abrasion-resistant thermally polymerizing curable composition is prepared to form an uncured layer consisting of this mixed composition on a resin substrate;

a solvent removing step in which the solvent in the uncured layer is removed;

a first polymerization curing step in which the organic-type polymerizing curable composition in the uncured layer is polymerized by irradiation with light or an electron beam;

a water-repellent layer forming step in which a silane coupling agent having a fluoro-alkyl group or a long-chain alkyl group is applied to the uncured layer after the first polymerization curing step; and a second polymerization curing step in which the silicone-type abrasion-resistant thermally polymerization curable composition in the uncured layer is polymerized by heating at a temperature not higher than 120° C.

In yet another aspect of the present invention, there is provided a method of forming a water-repellent and abrasion-resistant thin film, the method comprising:

an uncured layer forming step in which an uncured layer containing a silicone-type abrasion-resistant thermally polymerizing curable composition and a silane coupling agent having a fluoro-alkyl group or a long-chained alkyl groups is formed on a resin substrate through the intermediation of a primer layer; and a polymerization curing step in which the uncured layer is polymerized by heating at a temperature not higher than 120° C.

In a still further aspect of the present invention there is provided a water-repellent and abrasion-resistant thin-film forming method comprising:

an uncured under layer forming step in which an uncured under layer containing an organic-type abrasion-resistant radical polymerizing curable composition and a polysiloxane composition having silanol groups is formed on a resin substrate;

an uncured top layer forming step in which an uncured top layer containing a silicone-type abrasion-resistant thermally polymerizing curable composition and a silane coupling agent having a fluoro-alkyl group or a long-chain alkyl groups is formed on the uncured under layer;

an under-layer polymerization curing step in which the uncured under layer is polymerized by irradiation with light or an electron beam or by heating at a temperature not higher than 120° C.; and a top-layer polymerization curing step in which the uncured top layer is polymerized by heating at a temperature not higher than 120° C.

It is desirable that the silane coupling agent having fluorine be of a type which has undergone self-condensation.

DESCRIPTION OF THE PREFERRED EMBODIMENTS

Figure 1:
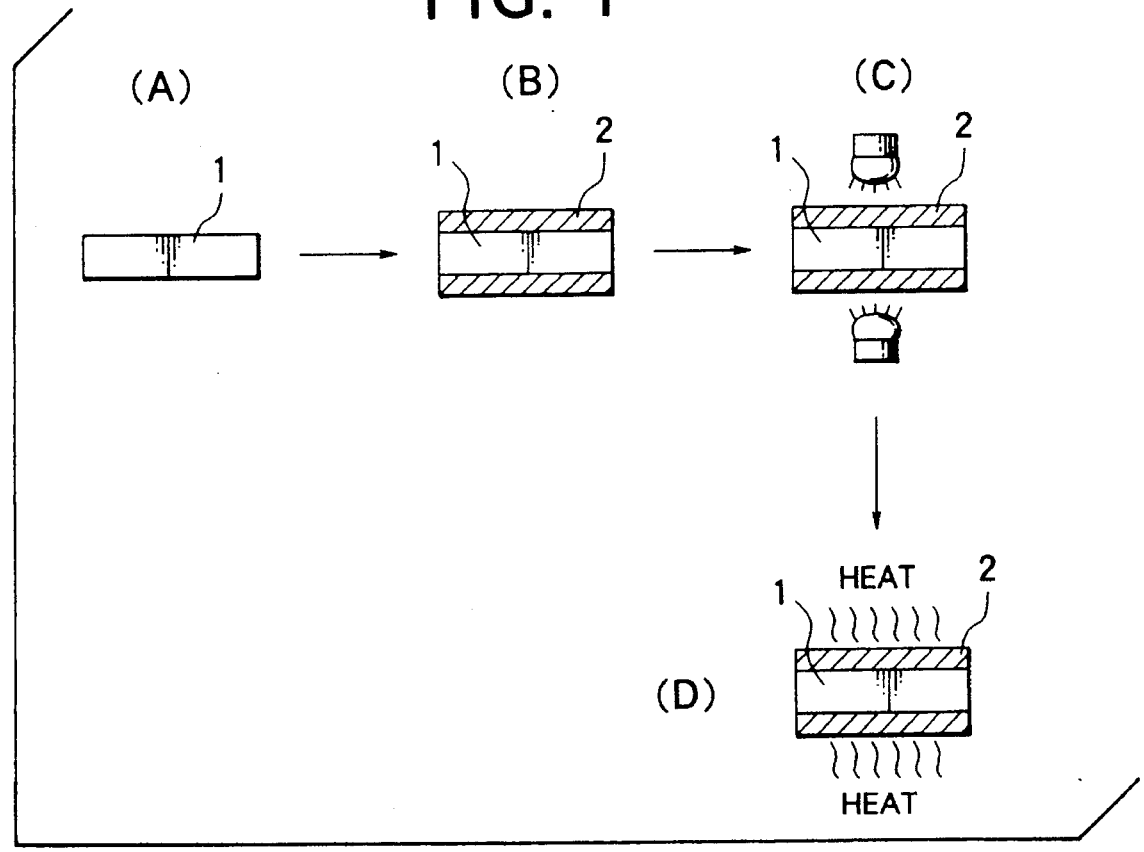
FIG. 1 is a schematic process diagram showing an embodiment of the method of this invention.

The resin substrate used in the method of the present invention may be a transparent resin substrate when it is to be used as a windowpane of an automobile or the like. When it is to be used as gears or the like, it may be an opaque resin substrate. For example, a methacrylic-type resin substrate, acrylic-type resin substrate, polycarbonate substrate, etc. may be employed.

The organic-type polymerizing curable compositions to be used in the method of the present invention may be an organic-type radical polymerizing curable composition, such as an organic-type photopolymerizing curable composition, an organic-type electron-beam polymerizing curable composition, or an organic-type thermally-polymerizing curable composition. Examples of the organic-type photopolymerizing curable composition include an acrylic-type UV-polymerizing curable coating (for example, DP-10 manufactured by Dainichiseika), and a phosphozene-type UV-polymerizing curable coating (for example, PPZ manufactured by Idemitsu). Examples of the organic-type electron-beam polymerizing curable composition include an acrylic-type electron-beam polymerizing curable coating. Examples of the organic-type thermally-polymerizing curable composition include an acrylic-type thermally-polymerizing curable coating, and a melamine-type thermally-polymerizing curable coating.

The silicone-type polymerizing curable composition to be used in the method of the present invention may be a silicone-type abrasion-resistant thermally-polymerizing curable composition. Examples of the silicone-type abrasion-resistant thermally-polymerizing curable composition include: a silicone-type polymerizing curable coating (for example, NP-730 manufactured by Nippon Dacroshamrock, Tosgard 510, manufactured by Toshiba Silicone, or KP-64 manufactured by Shin-Etsu Chemical, Co., Ltd.).

The mixed composition applied to the resin substrate for the purpose of forming an uncured layer contains an organic-type polymerizing curable composition and silicone-type polymerizing curable composition as mentioned above. The ratio of the silicone-type polymerizing curable composition to the organic-type polymerizing curable composition can be determined by the requisite abrasion resistance and compatibility. Usually, it is added in a proportion of 2 to 30 wt % calculated with respect to the solid portion of the organic-type polymerization curable composition.

It is desirable for this mixed composition to further include a silane coupling agent having at least one kind of the following organic-type functional groups methacrylic group, acrylic group, epoxy group, amino group and vinyl group; a silane coupling agent having at least one fluoroalkyl group; or a silane coupling agent having at least one alkyl group.

The ratio of the silane coupling agent to the organic-type polymerizing curable composition can also be determined by the requisite abrasion resistance and compatibility. Usually, it is added in a proportion of 2 to 30 wt % with respect to the solid portion of the organic-type polymerizing curable composition.

Examples of the silane coupling agent having at least one organic-type functional group include: a macromolecular coupling agent (for example, MMCA manufactured by Nippon Unicar), an epoxy-functional silane (for example, KBM-403, KBZ-402, or KBE-403 manufactured by Shin-Etsu Chemical, Co., Ltd.), an acrylic-functional silane (for example, KBM-5102 or KBM-5103 manufactured by Shin-Etsu Chemical, Co., Ltd.), and a UV-curable-type silicone hard coating agent (for example, X-12-2400 manufactured by Shin-Etsu Chemical, Co., Ltd.). Preferable examples of the silane coupling agent having methacrylic or acrylic groups include KBM-503, KBM-502 and KBE-502 manufactured by Shin-Etsu Chemical, Co., Ltd. Preferable examples of the silane coupling agent having vinyl groups include KBE-1003, KBM-003 and KA-1003 manufactured by Shin-Etsu Chemical, Co., Ltd.

Examples of the silane coupling agent having at least one fluoro-alkyl group include perfluoroalkyl silane [FAS having the chemical formula of $CF_3(CF_2)_nCH_2CH_2Si(OCnH_{2n+1})_3$ (where n is 0, 5, 7 or 9) (for example, KBM-7803 manufactured by Shin-Etsu Chemical, Co., Ltd.)], $CF_3(CF_2)_7CH_2CH_2SiCl_3$, etc.

It is desirable for the silane coupling agent having a long-chain alkyl group to have a carbon number of not less than 8, and more preferably, around 8 to 10 or so. Typical examples of such silane coupling agents include $CH_3(CH_2)_7Si(OCH_2CH_3)_3$ (A-137 manufactured by Nippon Unicar) and A-138 manufactured by Nippon Unicar.

It is desirable for the uncured layer formed on the resin substrate to have a thickness of not less than $3 \times 10^4$ Å but less than $6 \times 10^4$ Å. With a thickness outside this range, the abrasion resistance and adhesiveness obtained are rather poor.

In accordance with a first form of the thin-film forming method of the present invention, the uncured layer formed on the resin substrate consists of a mixed composition containing an organic-type polymerizing curable composition and a silicone-type polymerizing curable composition. The organic type polymerizing curable composition is organic type and the silicone-type polymerizing curable composition contains a polysiloxane composition having silanol groups.

Thus, while the solvent in the uncured layer is being removed, the ratio of the organic-type polymerizing curable composition increases on the resin-substrate-side of the uncured layer, whereas, on the surface-side of the uncured layer, the ratio of the silicone-type polymerizing curable composition increases, and the silanol groups of the polysiloxane composition on the silicone-type polymerizing curable composition are arranged in the surface-side.

When, in this condition, the uncured layer is polymerized, the resin substrate and the organic-type polymerizing curable composition form a firm resin adhesion without the intermediation of a primary layer, and the organic-type polymerizing curable composition and the silicone-type polymerizing curable composition are firmly bonded to each other through inter-molecular entanglement, with a large amount of silicon oxide being formed on the surface of the silicone-type polymerizing curable layer, whereby excellent abrasion resistance is obtained.

In the above-described thin-film forming method, it is possible to use the various silane coupling agents mentioned above in order to further improve the abrasion resistance of the thin film to be formed and to impart a satisfactory water repellency thereto. The organic functional groups in the silane coupling agents ensure satisfactory compatibility between the organic polymerizing curable composition and the silicone-type polymerizing curable composition. Thus, turbidity of the thin film can be prevented, and even superior adhesion can be obtained due to further entanglement of the molecules. When a silane coupling agent having at least one of organic-type functional groups, such as methacrylic, acrylic or vinyl group, is employed, the methacrylic groups, etc. are bonded in the uncured layer through radical reaction during the first and second polymerization curing steps due to the double bond of the organic-type functional groups, thereby providing superior adhesiveness.

In another preferable form of the thin-film forming method of the present invention, the uncured layer formed on the resin substrate consists of a mixed composition containing an organic-type polymerizing curable composition, a silicone-type abrasion-resistant thermally-polymerizing curable composition, and a silane coupling agent having a fluoro-alkyl group or a long-chain alkyl group. The organic-type polymerizing curable composition is an organic type, and a polysiloxane composition having silanol groups is contained in the silicone-type abrasion-resistant polymerizing curable composition and in the silane coupling agent.

Thus, while the solvent in the uncured layer is being removed, the ratio of the organic-type polymerizing curable composition increases on the resin-substrate-side of the uncured layer, whereas, on the surface-side of-the uncured layer, the ratio of the silicone-type abrasion-resistant polymerizing curable composition and of the silane coupling agent increases, and due to the surface tensile strength the fluoro-alkyl groups or the long-chain alkyl groups in the silane coupling agent are arranged on the surface-side section.

When, in this condition, the uncured layer is polymerized through first and second curing steps, the resin substrate and the organic-type polymerizing curable composition form a firm resin adhesion to each other without the intermediation of a primary layer, and the organic-type polymerizing curable composition, the silicone-type polymerizing curable composition, and the silane coupling agent are firmly bonded to each other through inter-molecular entanglement.

That is, the silanol (Si—OH) groups in the silicone-type abrasion-resistant thermally-polymerizing curable composition and the —OCH$_3$ groups or —Cl groups in the silane coupling agent react with each other resulting in the generation of a Si—O—Si siloxane bond between the silicone-type abrasion-resistant thermal y-polymerizing curable composition and the silane coupling agent.

In this way, the silicone-type abrasion-resistant thermally-polymerizing curable composition and the silane coupling agent having a fluoro-alkyl group are firmly bonded together. In this process, it is to be assumed that a de-alcoholing reaction. Further, in the presence of water a dehydration reaction occurs.

The water-repellent and abrasion-resistant thin film thus obtained is in a low-surface-free-energy state since the fluoro-alkyl or long-chain alkyl groups in the silane coupling agent exist on both the surface and the interior of film, and resulting in excellent water repellency. In addition, when using the fluoro-alkyl silane coupling agent, the surface-free-energy decrease because the polarizability of fluorine atom is small and an intermolecular cohesive force is week. As a result, the fluorine-containing film has a low interaction with water or an organic solvent, so that the film formed exhibits excellent water repellency.

Further, the surface and most of the interior of this water-repellent and abrasion-resistant thin film is obtained through curing of the silicone-type abrasion-resistant thermally-polymerizing curable composition, so that it exhibits excellent abrasion resistance.

In the above-described form, when the curing means for these two curable compositions, i.e., the organic-type polymerizing curable composition and the silicone-type polymerizing curable composition, which are combined into a mixed composition to form a cured thin film, are different from each other (for example, when one means is photopolymerization curing and the other is heat polymerization curing), the organic-type polymerizing curable composition is polymerization-cured by a first polymerization curing step, and the silicone-type polymerizing curable composition is polymerization-cured by a second polymerization curing step. It is desirable that these first and second polymerization curing steps be performed simultaneously since this shortens the requisite time for film formation. When the organic-type polymerizing curable composition and the silicone-type polymerizing curable composition are polymerization-cured by the same means, the first and second polymerization curing steps are unified.

In still another preferable form of the present invention, there is provided a process for forming a water-repellent and abrasion-resistant thin film, the process comprising the steps of a first stage for forming a first uncured layer consisting of a mixed composition containing an organic-type polymerizing curable composition and a silicone-type abrasion-resistant polymerizing curable composition, removing a solvent, and effecting polymerization curing; and, a second stage for forming an uncured water-repellent layer on the first uncured layer by using a silane coupling agent having a fluoro-alkyl or alkyl group and effecting heat polymerization curing.

In this form of the invention, the mixed composition, which is directly applied to the resin substrate, has no silane coupling agent having a fluoro-alkyl or alkyl group. However, after the polymerization curing of the organic-type polymerizing curable composition, the silane coupling agent is applied in the water-repellent layer forming process.

Before the polymerization curing process in the second stage, as the silicone-type abrasion-resistant thermally-polymerizing-curable composition has not yet been completely polymerized, in the water-repellent layer forming process and the second polymerization curing process, the silanol groups in the silicone-type abrasion-resistant thermally-polymerizing curable composition react with the —OCH$_3$ groups or —Cl groups in the silane coupling agent. This generates a Si—O—Si siloxane bond between the silicone-type abrasion-resistant thermally polymerizing curable composition and the silane coupling agent. As a result, the water-repellent layer is firmly bonded to the cured layer through entanglement of the molecules of the silicone-type abrasion-resistant thermal-polymerizing curable composition and the silane coupling agent.

In a further preferable form of the present invention, an uncured layer containing a silicone-type abrasion-resistant thermal-polymerizing curable composition and a silane coupling agent having a fluoro-alkyl group is formed on a resin substrate through the intermediation of a primer layer.

When the uncured layer is polymerized by heating at a temperature not higher than 20° C., the silanol (Si-OH) groups in the silicone-type abrasion-resistant thermal-polymerizing curable composition and the —OCH$_3$ groups or —Cl groups in the silane coupling agent react with each other in the uncured layer, so that a Si—O—Si siloxane bond is generated between the silicone-type abrasion-resistant thermal-polymerizing curable composition and the silane coupling agent to bond them firmly together. The water-repellent and abrasion-resistant thin film thus obtained is in a low-surface-free-energy state since the fluoro-alkyl groups in the silane coupling agent exist on both the surface and the interior of film, and therefore it exhibits excellent water repellency. In addition, the surface-free-energy decreases because the polarizability of fluorine atom is small and an intermolecular cohesive force is week, and as a result, the fluorine-containing film has a low interaction to water or an organic solvent, so that the film formed exhibits excellent water repellency.

Further, the surface and most of the interior of this water-repellent abrasion-resistant thin film is obtained through curing of the silicone-type abrasion-resistant thermal-polymerizing curable composition, so that it exhibits an excellent abrasion resistance.

In another preferable form of the present invention, an uncured under layer containing an organic-type abrasion-resistant radical-polymerizing curable composition and a polysiloxane composition having silanol groups is first formed on a resin substrate. Since the abrasion-resistant radical-polymerizing curable composition is an organic type, the silanol groups of the polysiloxane composition are positioned on the surface side.

Next, when the uncured under layer is polymerized by application of light or an electron beam or by heating at a temperature of not higher than 120° C., the abrasion-resistant radical-polymerizing curable composition is radical-polymerized to become an under layer.

By forming an uncured top layer containing a silicone-type abrasion-resistant thermal-polymerizing curable composition and a silane coupling agent on the uncured under layer or the under layer, the uncured under layer or the under layer is coated with the uncured top layer through the intermediation of silanol groups of the polysiloxane composition.

When the uncured top layer is polymerized by heating at a temperature not higher than 120° C., a siloxane bonding is generated between the silicone-type abrasion-resistant thermal-polymerizing composition and the silane coupling agent in the uncured top layer. Further, since silanol groups in the polysiloxane composition and —OCH$_3$ groups or —Cl groups in the silane coupling agent react with each other on the interface between uncured top layer and the uncured under layer or the under layer, a siloxane bonding is also generated between the silicone-type abrasion-resistant thermal-polymerizing curable composition and the silane coupling agent, thereby firmly bonding the under layer and the top layer to each other.

In the water-repellent abrasion-resistant thin film thus obtained, fluoro-alkyl groups or long-chain alkyl groups of the silane coupling agent exist on or near the surface of the top layer, so that this thin film is in a low-surface-free-energy state, and exhibits excellent water repellency.

Further, in this water-repellent abrasion-resistant thin film, the surface consists of the top layer formed on the under layer and mostly obtained through curing a silicone-type abrasion-resistant thermal-polymerizing curable composition. This water-repellent abrasion-resistant thin film exhibits an incremental increase in hardness, from the resin substrate to the top layer, due to the provision of the under layer. Thus, in this water-repellent and abrasion-resistant thin film, the under layer and the top layer satisfactorily adhere to each other.

In the various forms described above, when a silane coupling agent having a fluoro-alkyl group that is of a type which has undergone self-condensation is used, it is possible to obtain an even superior water repellency.

That is, commercial silicone-type abrasion-resistant thermally-polymerizing curable compositions are manufactured using tri-functional or tetra-functional siloxane monomers as the main material, and it is to be assumed that these monomers in the composition are turned into oligomers through condensation. Thus, if a commercial silane coupling agent is simply mixed with a commercial silicone-type abrasion-resistant thermally-polymerizing curable composition, the fluoro-alkyl silane coupling agent is drawn into the matrix of the resin during curing and is not easily exposed on the surface due to the large molecular weight of the commercial silicone-type abrasion-resistant thermally-polymerizing curable composition.

In the case of a silane coupling agent which has undergone self-condensation, the three alkoxy groups undergo hydrolysis and condensation so as to assume a resin structure, with the result that density increases, thereby providing further improved water repellency.

DESCRIPTION OF THE PREFERRED EMBODIMENTS

Example 1

As illustrated in FIG. 1 (A), a plate (100×100×4(mm)) formed of polycarbonate (Mitsubishi Chemical Corporation: average molecular weight of 22000) produced by injection-molding was used as resin substrate 1. The resin substrate 1 was cleaned ultrasonically in isopropanol for 3 minutes and then dried.

Uncured layer forming step

An acrylic-type UV-polymerizing-curable coating solution (Dainichiseika Color & Chemicals Mfg. Co., Ltd.: Seika Beam DP-10) was prepared for use as the organic polymerizing curable composition. A polysiloxane thermally-polymerizing curable coating solution (Nippon Dacron Shamrock: NP-730) was also prepared for use as the silicone-type polymerizing curable composition.

2 to 30 parts by weight. (calculated with respected to the solid portions) of a polysiloxane thermally-polymerizing curable coating solution were added to 100 parts by weight of an acrylic-type UV-polymerizing curable coating solution, thus resulting in a coating mixture. The coating mixture was loaded into a dipping basin and kept therein at a constant bath temperature of 15° C.

The dried resin substrate 1 was dipped for 30 seconds in the dipping basin and then removed at a speed of 28 cm per minute. An uncured layer 2 formed of the coating mixture was thus deposited on both sides of the resin substrate 1, as shown in FIG. 1 (B).

Solvent removing step

The resin substrate 1 having the uncured layers 2 formed thereon was placed in a dryer at 60° for 3 minutes thereby removing the solvent contained in the uncured layers 2. As the acrylic-type UV-polymerizing curable coating solution was an organic type and the polysiloxane thermally-polymerizing curable coating solution contained a polysiloxane composition having silanol groups during the above-described solvent removing step, the acrylic-type UV-polymerizing curable coating was tended to gravitate toward the uncured layers 2 adjacent to the resin substrate 1 while the polysiloxane thermally-polymerizing curable coating was inclined to be drawn to the outer surfaces of the uncured layers 2 further causing the silanol groups contained in the polysiloxane thermally-polymerizing curable coating solution to be arranged on the outer surfaces of the uncured layers 2.

First polymerization curing step

Thereafter as illustrated in FIG. 1 (C) the resin substrate 1 having the solvent-removed uncured layers 2 formed thereon was irradiated with ultraviolet rays (UV) between two high-pressure mercury vapor lamps opposite each other (80 W/cm) at 2 m/minute×2 passes. This irradiation caused the polymerizing curable component of the acrylic-type UV-polymerizing-curable coating contained in the uncured layers to undergo radical-polymerization. The uncured layers 2 were thus partially cured.

Second polymerization curing step

Figure 2:
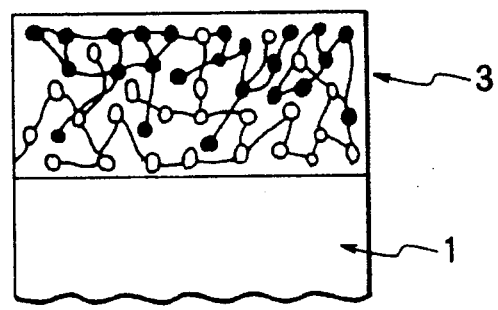
FIG. 2 is a schematic sectional view of a thin film obtained in Example 1.

Subsequently as shown in FIG. 1 (D) the resin substrate 1 having underwent the first curing step was kept in a dryer at 120° for 90 minutes. This caused the polysiloxane thermally-polymerizing curable coating contained in the uncured layers 2 to undergo condensation polymerization. Thus the uncured layers 2 were almost completely cured resulting in a thin film 3 formed on the resin substrate 1 and formed of a coating mixture of the acrylic-type UV-polymerizing cured coating and the polysiloxane thermally-polymerizing cured coating, as illustrated in FIG. 2. Also in FIG. 2, bonding between white dots indicates the network of the acrylic-type UV-polymerizing cured coating, while bonding between black dots represents the network of the polysiloxane thermally-polymerizing cured coating. The thickness of the thin film 3 was 4.6 μm.

In this thin film 3, a strong resin adhesion between the resin substrate 1 and the acrylic-type UV-polymerizing curable coating was obtained even without the intermediation of a primer layer therebetween. The acrylic-type UV-polymerizing curable coating and the polysiloxane thermally-polymerizing curable coating were also intimately bonded to each other due to the entanglement of both molecules. Further, a large amount of silicon oxide was formed on the surface of the polysiloxane thermally-polymerizing-curable coating. All of the above contributed to the film having excellent adhesion resistance.

As described above the thin film 3 has a strong adhesion with the resin substrate I even without the intermediation of a primer layer therebetween, thus exhibiting superior abrasion resistance.

Example 2

In this example, 2 to 30 parts by weight, calculated in terms of solids, of a polysiloxane thermally-polymerizing curable coating solution was added to 100 parts by weight of an acrylic-type UV-polymerizing curable coating solution. 1 to 10 parts by weight of a silane coupling agent (Shin-Etsu Chemical Co., Ltd.: KBM-403) was further added, thus resulting in a coating mixture. The other constructions were the same as those of the first example.

Example 3

In this example, a silane coupling agent having a molecular weight in a range from 2000 to 10000 containing a polysiloxane skeleton (Nippon Unicar Co., Ltd.: MAC-2101) was used as the silicone-type polymerizing curable composition. That is, 2 to 30 parts by weight of the silane coupling agent (Nippon Unicar Co., Ltd.: MAC-2101) calculated in terms of solids was added to 100 parts by weight of an acrylic-type UV-polymerizing curable coating solution, thus resulting in a coating mixture. The other constructions were the same as those of Example 1.

Comparative Example 1

In this comparative example, a thin film was formed on the resin substrate I by using only the acrylic-type UV-polymerizing-curable coating solution. The other constructions were the same as those of Example 1.

Comparative Example 2

In this comparative example, a thin film was formed on the resin substrate 1 by using only the polysiloxane thermally-polymerizing curable coating solution. The other constructions were the same as those of Example 1.

Test 1

Evaluations were made on the adhesive properties on of the respective thin films of Examples 1, 2 and 3 and Comparative Examples 1 and 2. The adhesion evaluations were performed according to a cross-cut adhesion test method, which is a coating adhesion test method specified by JIS. The results are shown in Table 1.

TABLE 1

|  | Example 1 | Example 2 | Example 3 | Comp. Ex. 1 | Comp. Ex. 2 |
| --- | --- | --- | --- | --- | --- |
| Number of cross-cut pieces peeled off/100 | 0 | 0 | 0 | 0 | 63 |

Table 1 clearly shows that the thin films of Examples 1 to 3 and Comparative Example 1 exhibit excellent adhesion, while the thin film of the second comparative example suffers from poor adhesion due to the absence of an intermediate primer layer.

Test 2

Figure 3:
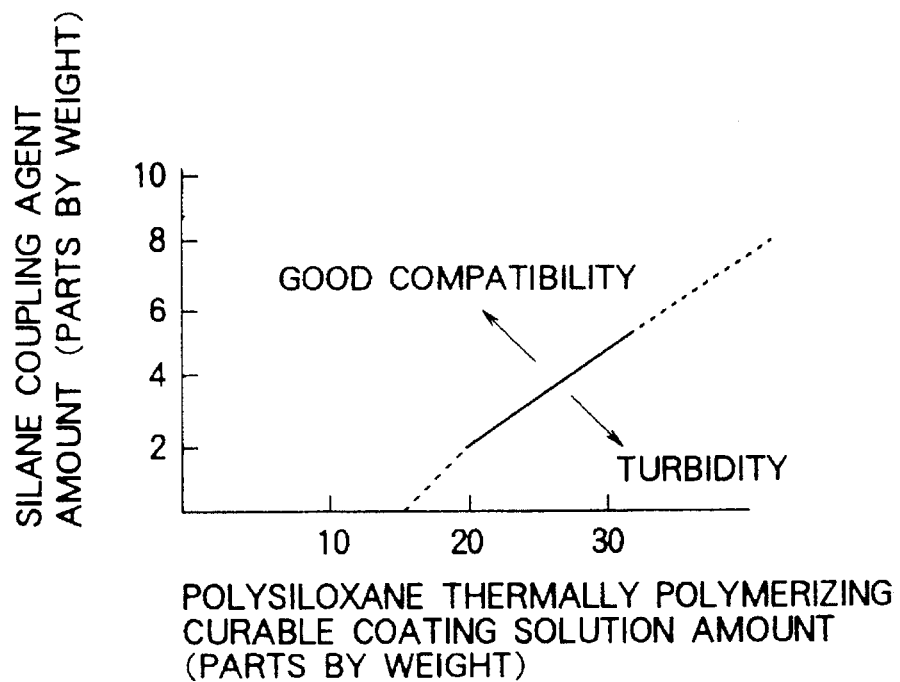
FIG. 3 is a graph showing the characteristics of Example 2 as obtained by Test 2.

In this test, the amount of the polysiloxane thermally-polymerizing curable coating solution which was added to 100 parts by weight of acrylic-type UV-polymerizing curable coating solution in Example 1 was varied. Also, the amounts of the polysiloxane thermally-polymerizing curable coating solution and the silane coupling agent which were added to 100 parts by weight of the acrylic-type UV-polymerizing curable coating solution in Example 2 were varied. Further, the amount of the silane coupling agent containing polysiloxane skeleton which was added to 100 parts by weight of the acrylic-type UV-polymerizing curable coating solution in Example 3 was varied. Thereafter, the compatibility of each of the thus-obtained coating mixtures was evaluated. The results of the evaluations on Examples 1 and 3 are shown in Tables 2 and 3, respectively. The results of the evaluations on Example 2 are shown in FIG. 3.

In Tables 2 and 3, the mark o indicates that the coating mixture was transparent due to its good compatibility, while the mark Δ shows that the coating mixture became turbid due to its poor compatibility.

TABLE 2

| Polysiloxane thermally-polymerizing curable coating solution (solid, parts by weight) | | | | | | |
|---|---|---|---|---|---|---|
| 2 | 5 | 10 | 15 | 20 | 25 | 30 |
| Example 1 | | | | | | |
| O | O | O | O | Δ | Δ | Δ |

TABLE 3

| Silane coupling agent containing polysiloxane skeleton (solid, parts by weight) | | | | | | |
|---|---|---|---|---|---|---|
| 2 | 5 | 10 | 15 | 20 | 25 | 30 |
| Example 3 | | | | | | |
| O | O | O | O | O | O | O |

Table 2 shows that in Example 1, 20 parts by weight of polysiloxane thermally-polymerizing curable coating solution deteriorates the compatibility of the resultant coating mixture, thus causing the coating mixture to become turbid. 30 parts by weight or more of such a coating exhibited poor transparency of the resultant cured thin film.

As is seen from FIG. 3, in Example 2, even if 30 parts by weight of the polysiloxane thermally-polymerizing curable coating solution were added, the addition of 5 parts by weight of silane coupling agent ensured good compatibility of the resultant coating mixture. This indicates that in Example 2 organic functional groups contained in the silane coupling agent ensure good compatibility between the acrylic-type UV-polymerizing curable coating solution and the polysiloxane thermally-polymerizing curable coating solution in the uncured layer 2, thereby preventing the thin film 3 from becoming turbid and also exhibiting even better adhesion due to stronger entanglement between the molecules. However, when a polysiloxane polymerizing curable coating solution in excess of 30 parts by weight was added, spherical separated materials, which are thought to be caused by phase separation, were detectable on the thin film.

Table 3 indicates that in Example 3 the addition of even 30 parts by weight of the silane coupling agent containing polysiloxane skeleton does not affect the good compatibility between the two coatings. Thus, in Examples 2 and 3, organic functional groups contained in the silane coupling agent ensured good compatibility between the acrylic-type UV-polymerizing curable coating solution and the polysiloxane components in the uncured layer 2, thereby preventing the thin film 3 from becoming turbid and also exhibiting even better adhesion due to stronger entanglement between the molecules.

Test 3

The Taber abrasion test was performed on the thin films of Examples 1 and 3 and Comparative Example 1 to evaluate the abrasion resistance of the films. The Taber abrasion test consisted of placing specimens on a turn table and then bringing them into contact with two rubber, abrasive grain-containing abrasion rings having a load applied thereon and thereafter rolling the specimens. In this test, increases in the Haze value (H) brought about by traces of abrasion on the surface of the thin films after the abrasion test were calculated to evaluate the abrasion resistance of the thin films. That is, the specimens were rolled with a predetermined load, a predetermined number of times, and then, the Haze values of the thin films were measured. The Haze values were obtained by applying white light to the surface of the thin film and calculating the ratio of the resultant light scattering caused by surface flaws according to the following equation:

$$H(\%) = (T_4/T_2 - T_3/T_1) \times 100$$

where $T_1$ indicates the amount of incident light on the thin film; $T_2$ represents the amount of light transmitted through the thin film; $T_3$ indicates the amount of light diffused to the tester; and $T_4$ represents the amount of the transmitted light diffused by the thin film.

In this test, the fewer the abrasion marks produced by the abrasion rings, the lower the Haze value. That is, the smaller increase in the Haze value (%) of the thin film subsequent to the test when compared to the Haze value of before the test confirms better abrasion resistance. The results are shown in FIG. 4.

Figure 4:
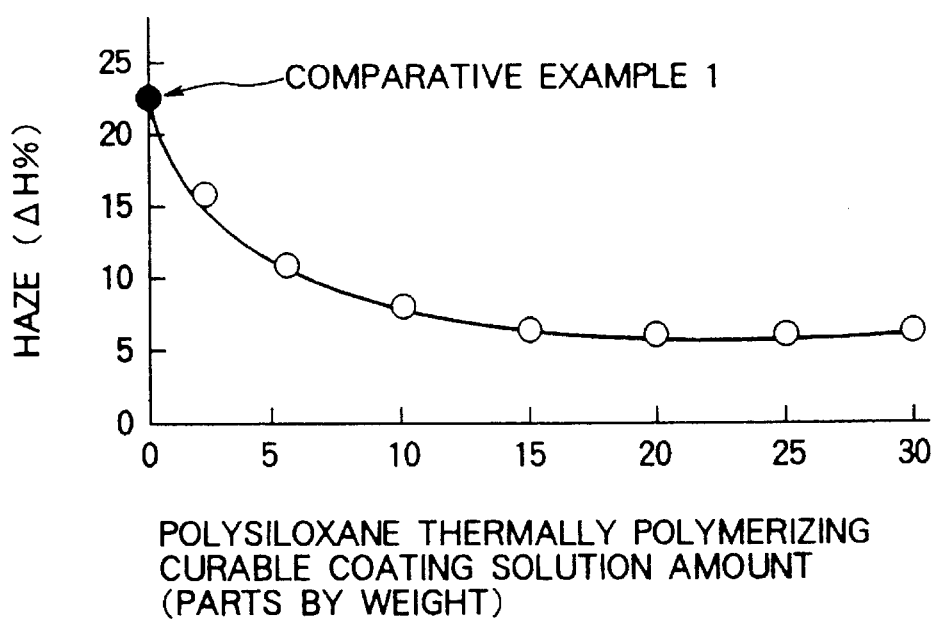
FIG. 4 is a graph showing the characteristics of Examples 1 and 3 as obtained by Test 3.

FIG. 4 clearly shows that the thin films obtained by increasing the amounts of the polysiloxane polymerizing curable coating solution and the silane coupling agent containing polysiloxane skeleton of Examples 1 and 3, respectively, added to the acrylic-type UV-polymerizing curable coating solution, exhibit better abrasion resistance compared to the thin film of Comparative Example 1.

Test 4

Surface element composition analysis was carried out using XPS (PHI-5500MC, Monochromated-AlKα) measurements of the thin film formed of the coating mixture obtained by adding 10 parts by weight of a polysiloxane thermally-polymerizing curable coating solution calculated in terms of solids and 10 parts by weight of a silane coupling agent calculated in terms of solids to 100 parts by weight of an acrylic-type UV-polymerizing curable coating solution. The results are shown in Table 4.

TABLE 4

| | Element Composition (at %) | | |
|---|---|---|---|
| | C | O | Si |
| Example 2 | 45.0 | 39.0 | 16.0 |

Ten odd at % of Si (except for H) should be contained in the polysiloxane thermally-polymerizing curable coating solution and the silane coupling agent present in the coating mixture of Example 2. Table 4 shows that approximately 16.0 at % of Si was present on the surface of the thin film of Example 2. It has thus been confirmed that a large amount of silicon oxide consisting of dehydrated bonds of the polysiloxane thermally-polymerizing curable coating and the silane coupling agent was formed on the surface of the thin film.

Upon analysis of the C1s spectrum on the thin film of Example 2, the peak originating from —O—C=O— carbons which were not contained in the coating mixture was detected, and it is thought that an acrylic component was also partially exposed on the surface.

It is thus seen that thin film 3 of Example 2 was constructed in such a manner that film 3 adjacent to the resin substrate 1 was richer in the acrylic component, whereas the outer surface of thin film 3 was richer in the polysiloxane component. This further confirms the following construction of thin film 3. A strong adhesion between the polycarbonate and the acrylic component was achieved on thin film 3 adjacent to resin substrate 1, while a strong adhesion between the acrylic component and the polysiloxane component was realized in the interior of thin film 3. Further, a large amount of the polysiloxane component containing silicon oxide was formed on the surface of thin film 3, thus exhibiting an even better abrasion resistance.

As will be clearly understood from the foregoing description, the thin film forming method demonstrated in Example makes it possible to form a thin film having sufficient adhesion with the resin substrate and also exhibiting excellent abrasion resistance without the intermediation of a primer layer.

Therefore, this forming method is not only simple but can also be employed to form a thin film on a resin substrate whereby good abrasion resistance and strong adhesion can be achieved by the thin film. As a consequence of using this method, transparent resin glass can easily be used as windows for vehicles or the like, and resin products can also be easily used as mechanical gears or the like, when the goal is to use a lightweight, easily workable material with excellent molding properties.

Further, the use of a silane coupling agent having at least one methacrylic, acrylic, epoxy, amino or vinyl functional group ensures good compatibility, thereby preventing the thin film from becoming turbid and also exhibiting even better adhesion.

Example 4

As illustrated in FIG. 1(A), a plate (100×100×4 (mm)) formed of polycarbonate (Mitsubishi Chemical Corporation: FE2000 having an average molecular weight of 22000) produced by injection-molding was used as resin substrate 1. This resin substrate 1 was cleaned ultrasonically in isopropanol for 3 minutes and then dried.

Uncured layer forming step

An acrylic-type UV-polymerizing-curable coating solution (Dainichiseika Color & Chemicals Mfg. Co., Ltd.: Seika Beam DP-10) was used as the organic polymerizing curable composition. Also, a mixture of a silane coupling agent (Shin-Etsu Chemical Co., Ltd.: KBM-403) and a silicone-type thermally-polymerizing curable coating solution (Nippon Dacron Shamrock: Sol Gard NP-730) was used as the silicone-type abrasion-resistant thermally-polymerizing curable composition. Further, FAS (Shin-Etsu Chemical Co., Ltd.: KBM-7803 having a molecular weight of 568 and a specific gravity of 1.53) was used as the fluoro-alkyl silane coupling agent.

1 to 10 parts by weight of FAS calculate in terms of solids were added to 100 parts by weight of the silicone-type thermally-polymerizing curable coating solution and then stirred. 5 to 20 parts by weight of the resultant mixture calculated in terms of solids were added to 100 parts by weight of the acrylic-type UV-polymerizing curable coating solution and then stirred, thus resulting in a coating mixture. The thus-obtained coating mixture was loaded into a dipping basin and kept therein at a constant bath temperature of 15° C.

The dried resin substrate 1 was dipped for 30 seconds in the dipping basin and then removed. An uncured layer 2 formed from the coating mixture was thus deposited on both sides of resin substrate 7, as shown in FIG. 1(B).

Solvent removing step

The resin substrate 1 having the uncured layers 2 formed thereon was placed in a dryer at from 60° to 80° C. for 1 to 5 minutes thereby removing the solvent contained in the uncured layers 2. As the acrylic-type UV-polymerizing curable coating solution is an organic type, and the silicone-type thermally-polymerizing curable coating solution and the FAS contain a polysiloxane composition having silanol groups, during the above-described solvent removing step, the acrylic-type UV-polymerizing curable coating tended to be gravitate to the uncured layers 2 adjacent to the resin substrate 1, while the silicone-type thermally-polymerizing curable coating and the FAS were drawn to the outer surfaces of the uncured layer 2, further causing the fluoro-alkyl groups contained in the silicone-type thermally-polymerizing curable coating solution and the FAS to be arranged on the outer surfaces of the uncured layer 2.

First polymerization curing step

Thereafter, as illustrated in FIG. 1(C), the resin substrate 1 having the solvent-removed uncured layers 2 formed thereon was irradiated with ultraviolet rays (UV) between two high-pressure mercury vapor lamps opposite each other (80W/cm) at 1–2.5 m/minute×2 passes. This irradiation caused the polymerizing curable component contained in the acrylic-type UV-polymerizing curable coating in the uncured layers 2 to undergo radical polymerization. The uncured layers 2 were thus partially cured.

Second polymerization curing step

Subsequently, as shown in FIG. 1(D), the resin substrate 1 having underwent the first curing step was kept in a dryer at 120° C. for from 60 to 90 minutes. This caused the silicone-type thermally-polymerizing curable coating contained in the uncured layers 2 to undergo condensation polymerization. Thus, the uncured layers 2 were almost completely cured.

Figure 5:
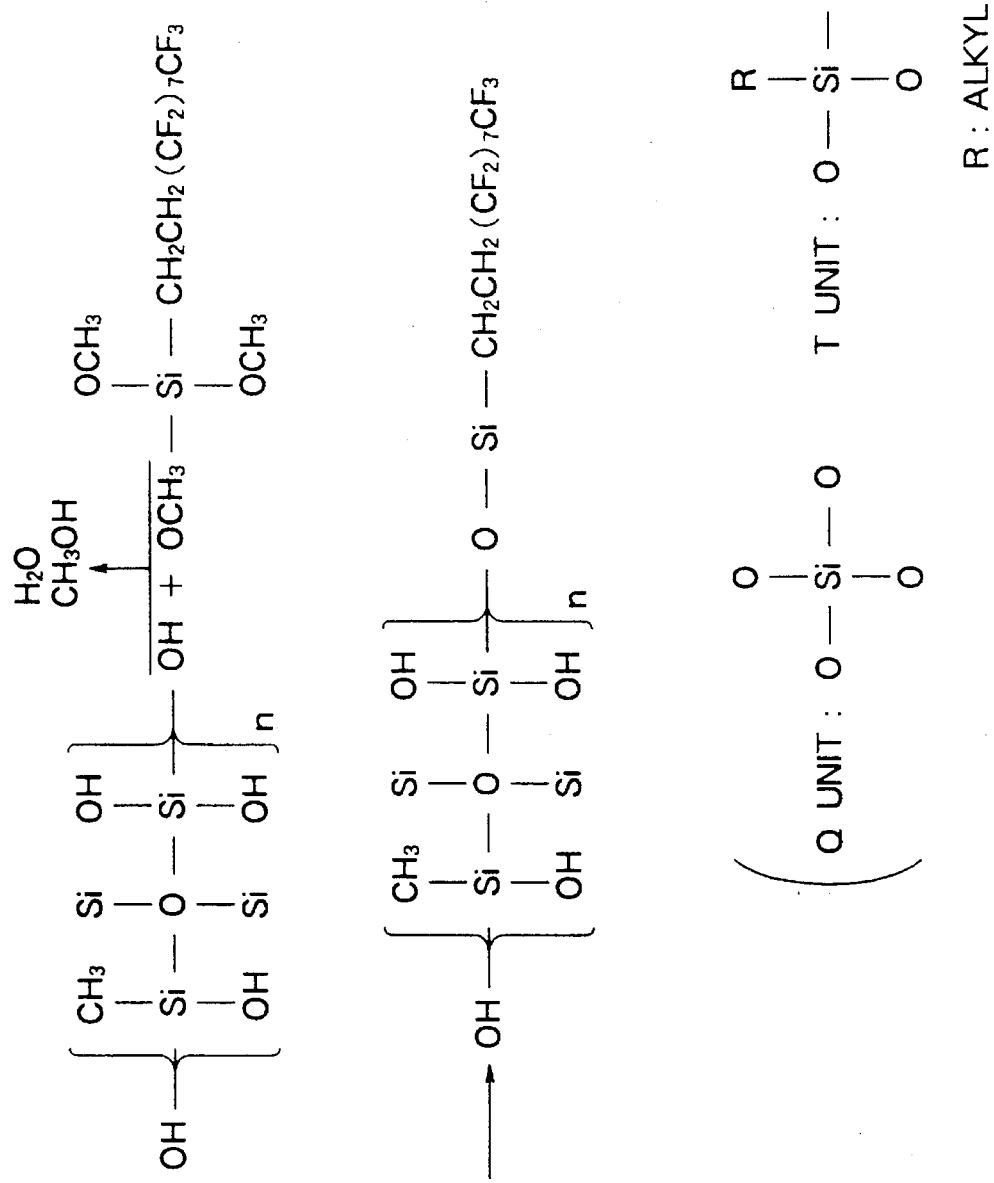
FIG. 5 is a diagram showing how a silicone-type thermally polymerizing curable coating reacts with an FAS (fluoro-alkyl silane coupling agent) in Examples 4 and FIG. 6 is a schematic sectional view of a water-repellent and abrasion-resistant thin film obtained in Example 4.

As illustrated in FIG. 5, the silicone-type thermally-polymerizing curable coating is obtained by mainly blending trifunctional and tetrafunctional polysiloxane compounds, which are referred to as T units and Q units, respectively, and adding a suitable catalyst and water. As these OH groups exist in the polysiloxane compounds, they react with —OCH$_3$ groups in the FAS, thus producing siloxane bonding therebetween and further achieving strong adhesion between the coating and the FAS. During the above-described reaction, it was likely that a methanol-removing reaction or dehydration reaction occurred due to the presence of water.

Figure 6:
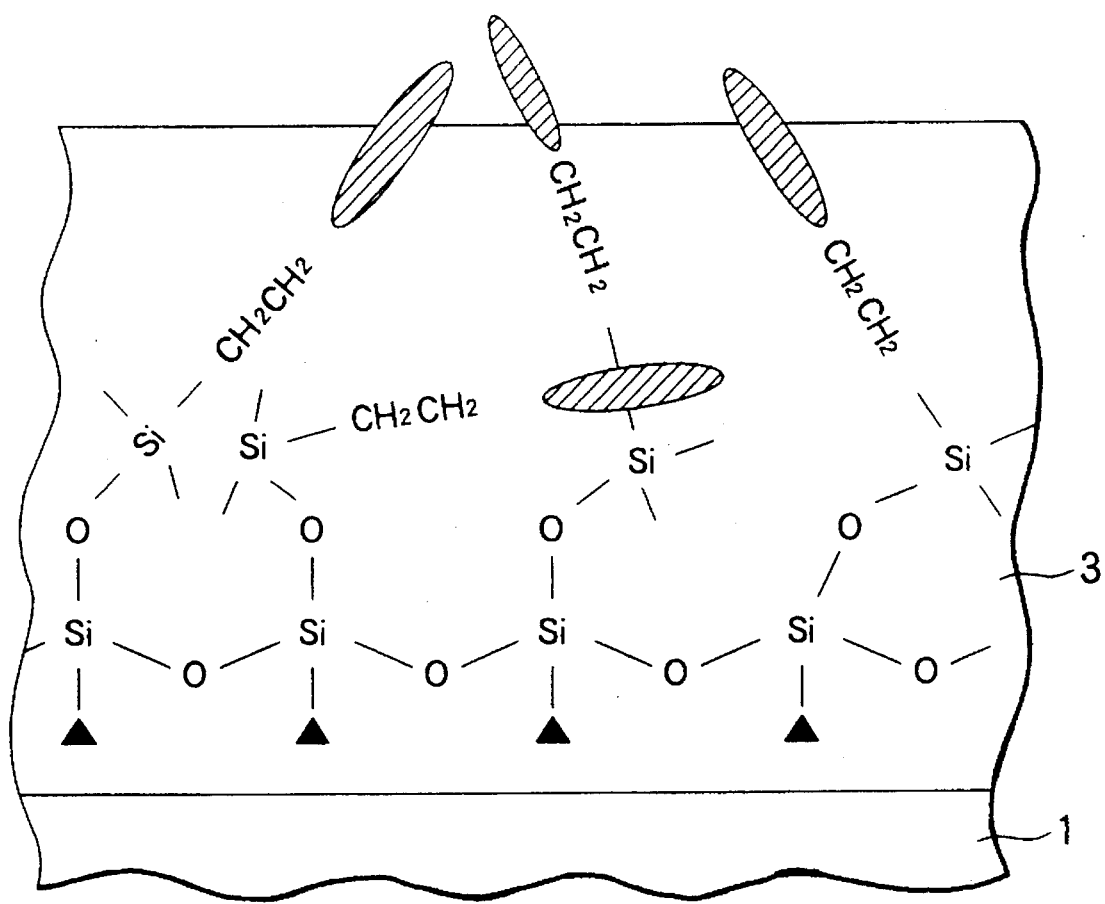

The thickness of the water-repellent and abrasion-resistant thin film 3 formed on the resin substrate as described above was 4.6 μm. As illustrated in FIG. 6, a strong resin adhesion was achieved between the resin substrate 1 and the acrylic-type UV-polymerizing cured coating contained in this thin film 3 even without having an intervening primer layer. Strong bonding was also accomplished between the acrylic-type UV-polymerizing cured coating and the FAS and the silicone-type thermally-polymerizing cured coating having epoxy groups due to entanglement between the molecules.

The portions —(CF$_2$)$_7$CF$_3$ of the FAS (indicated by hatched portions in FIG. 6) produced by siloxane bonding were present on both the surface and the interior of the thin film 3. Upon analyses by XPS (PHI-5500 MC, Monochromated-ALKα) and FT.IR(JEOL, Ltd. JIR-100), it was confirmed that polysiloxane compounds and fluoro-alkyl groups were exposed on the surface of the thin film 3, thus resulting in a low-surface-free-energy, and excellent water-repellency. Based on the fact that the FAS having a boiling point of 85° to 87° C., was maintained at 120° C. during the heating process, the FAS should have scattered unless it was allowed to react with the silicone-type thermally-polymerizing curable coating. However, considering the superior water-repellency of the thin film 3, it can be assumed that the FAS was allowed to react with the coating and thus did not scatter. Also, since the film 3 was thermally treated at 120° C. or lower, neither the substrate 1 nor the silicone-type thermally-polymerizing cured coating deteriorated.

Also, almost the entire outer surface and interior of the water-repellent and abrasion-resistant film 3 was formed of the thermally-curable silicone-type coating. This coating further formed a large amount of silicon oxide on the outer surface of the film 3, thereby exhibiting excellent abrasion resistance.

As will be clearly understood from the foregoing description, the thus-obtained thin film 3 exhibits very good water-repellency and also has a sufficient adhesion with the resin substrate 1 even without having the intermediation of a primer layer, thus exhibiting excellent abrasion resistance.

Example 5

Figure 7:
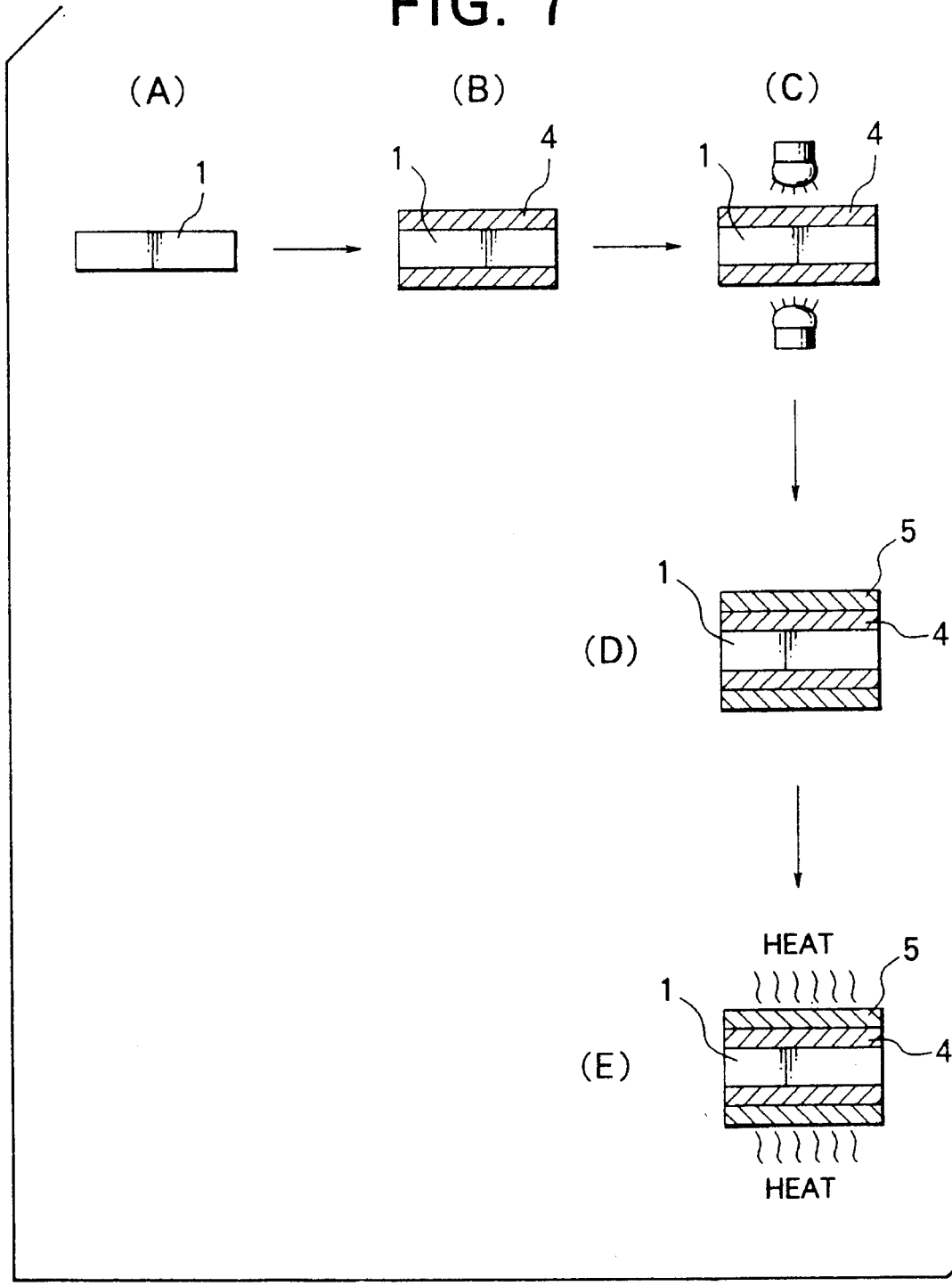
FIG. 7 is a schematic process diagram showing the method according to Examples 5 and 7.

As shown in FIG. 7(A), the dried resin substrate 1 was prepared in the same manner as Example 4.

Uncured layer forming step

An acrylic-type UV-polymerizing curable coating solution and a silicone-type thermally-polymerizing curable coating of the same types as those used in Example 4 were used.

5 to 20 parts by weight, calculated in terms of solids, of a silicone-type thermally-polymerizing curable coating solution having epoxy groups were added to 100 parts by weight of an acrylic-type UV-polymerizing curable coating solution and then stirred, thus resulting in a mixed composition. As illustrated in FIG. 7(B), uncured layers 4 consisting of this mixed composition were formed on both sides of the resin substrate 1 in the same manner as Example 4.

Solvent removing step

In this example, solvents contained in the uncured layers 4 were removed by the same steps as used in Example 4. The acrylic-type UV-polymerizing curable coating solution is an organic type, while the silicone-type thermally-polymerizing curable coating solution contains a polysiloxane composition having silanol groups. Because of the properties of these coating solutions, during the above-described solvent removing step, the acrylic-type UV-polymerizing curable coating tended to gravitate toward the uncured layer 4 adjacent to the resin substrate 1, while the silicone-type thermally-polymerizing curable coating drawn to the outer surfaces of the uncured layers 4, further causing silanol groups contained in the silicone-type thermally-polymerizing curable coating to be arranged on the outer surfaces of the uncured layers 4.

First polymerization curing step

Thereafter, as in Example 4, a polymerizing curable component of the acrylic-type UV-polymerizing curable coating in the uncured layers 4 was allowed to undergo radical polymerization, as shown in FIG. 7(C). The uncured layers 4 were thus partially cured.

Water-repellent layer forming step

Subsequently, the same type of FAS as that used in the fourth example was dissolved in methanol, thus preparing a diluted liquid. The FAS may be diluted with other types of alcohol such as ethanol, isopropanol, n-butanol or the like, in place of methanol. As illustrated in FIG. 7(D), this diluted liquid was applied to the partially-cured layers 4 using flannel so as to form water-repellent layers 5 thereon.

It should be noted that it is be difficult to apply the diluted liquid to uncured layers 4 which are formed only of the acrylic-type UV-polymerizing curable coating because of hydrophobic properties thereof.

Second polymerization curing step

Next, as in Example 4, the resultant layers were heated, as shown in FIG. 7(E). Before performing the second polymerization curing step, it was confirmed by FTIR analysis that the silicone-type thermally-polymerizing curable coating was not been completely polymerized, and thus OH groups remained on the surface of the layers. Therefore, during the second polymerization curing step, silanol groups contained in the silicone-type thermally-polymerizing curable coating were reacted with —OCH$_3$ groups contained in the FAS, thus producing siloxane bonding therebetween, as shown in FIG. 5.

In the thus-obtained water-repellent and abrasion-resistant thin film 6 formed on the resin substrate 1, strong adhesion between the water-repellent layer 5 and the cured layer 4 was achieved due to entanglement between the molecules of the silicone-type thermally-polymerizing curable coating and the FAS. The thin film 6 was thus constructed in the same manner as that of Example 4.

Example 6

Figure 9:
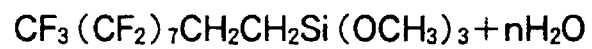
FIG. 9 is a diagram showing the condensation reaction of the FAS in Example 6.
Figure 9:
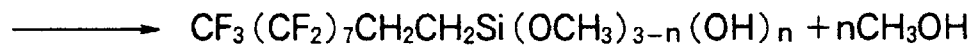
Figure 10:
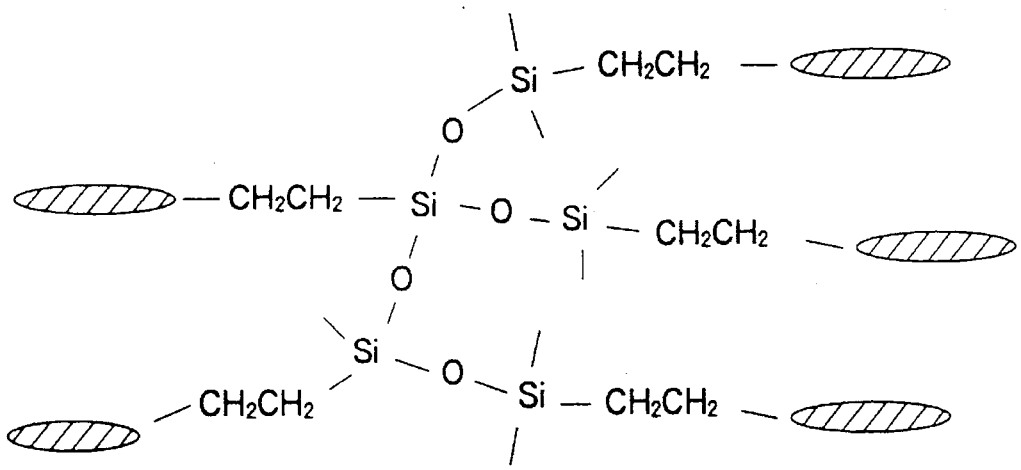
FIG. 10 is a diagram showing the chemical formula of the FAS oligomer.

In this example, the FAS had been self-condensed in advance. That is, water and n-butanol were added to commercially-available FAS at room temperature and then stirred, thus preparing the condensed FAS. 0.5 parts by weight of water and 500 parts by weight of n-butanol were added to 100 parts by weight of the FAS calculated in terms of solids. The FAS was thus reacted with water and n-butanol, as shown in FIG. 9, and self-condensed to result in a FAS oligomer, as illustrated in FIG. 10.

The FAS oligomer was added at room temperature to the silicone-type thermally-polymerizing curable coating solution which had been pre-loaded in a dipping basin, and then stirred, thus resulting in a top hardcoat liquid. The amount of the FAS oligomer added to 100 parts of the silicone-type thermally-polymerizing curable coating solution calculated in terms of solids was 1 to 10 parts by weight. The other constructions were the same as those of Example 4.

Figure 11:
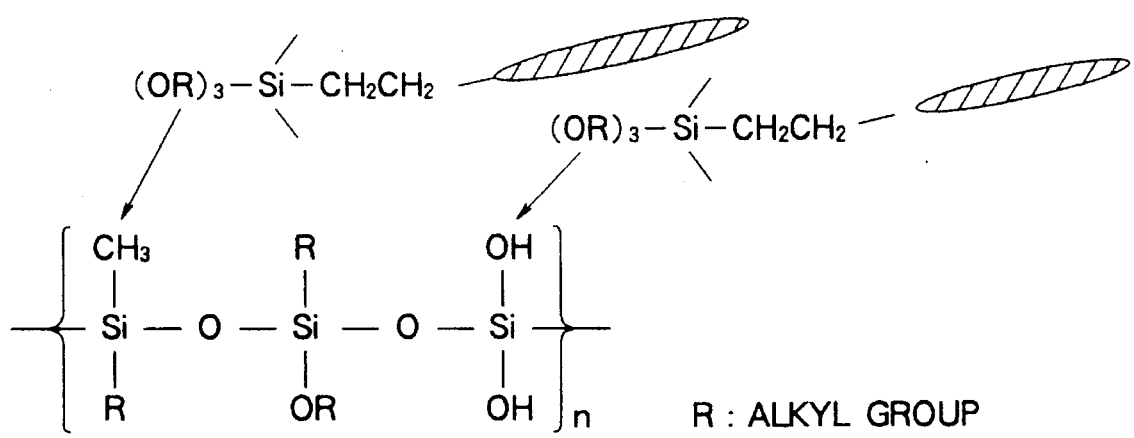
FIG. 11 is a diagram showing the reaction of the silicone-type thermally polymerizing curable coating with the FAS in Example 4.

It can be assumed that the commercially-available silicone-type thermally-polymerizing curable coating solution merely results from the oligomerization of monomers by way of condensation. Based on this assumption, if the commercially-available FAS is merely mixed with the commercially-available silicone-type thermally- polymerizing curable coating solution according to the forming method employed in Example 4, it is likely that the FAS will only be linearly bonded to the coating, as illustrated in FIG. 11. As a consequence, when the forming method of Example 4 is employed, as the molecular weight of the monomers and polymers within the silicone-type thermally-polymerizing curable coating have large molecular weights, the FAS is drawn into the matrix of the resin during curing, which further inhibits —$(CF_2)_7CF_3$ s from being exposed on the surface.

Figure 12:
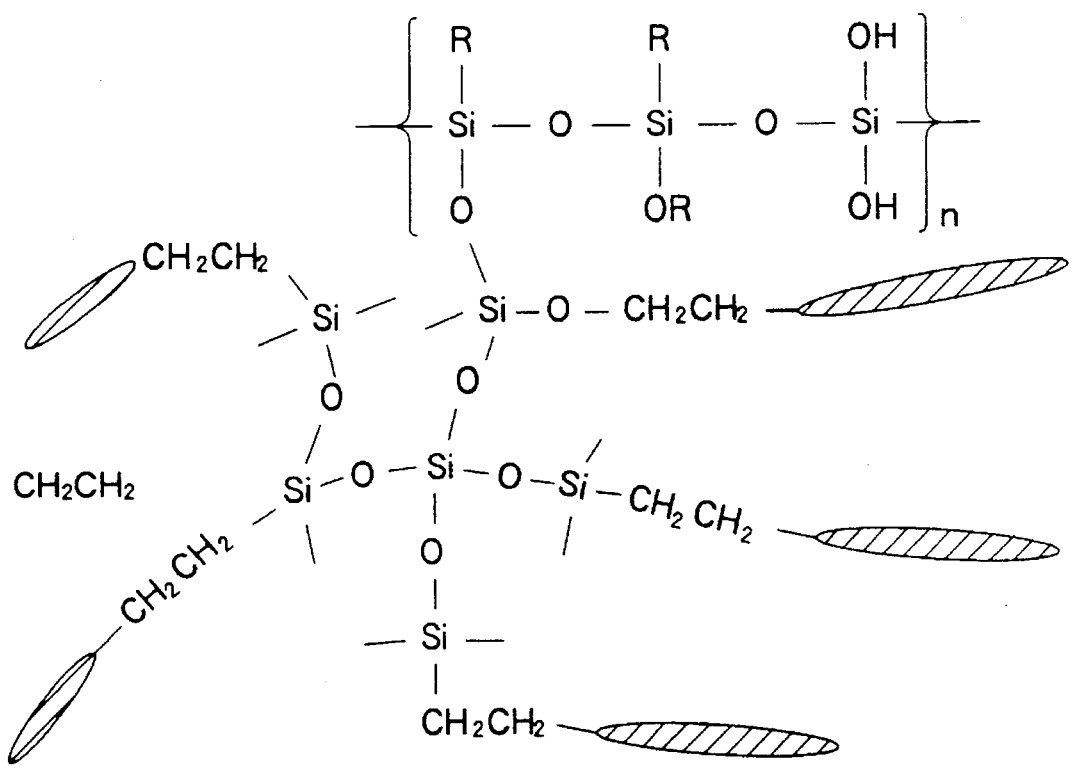
FIG. 12 is a diagram showing the reaction of the silicone-type thermally polymerizing curable coating with the FAS in Example 6.

In contrast, according to the forming method of Example 6, since the FAS oligomer is employed, the FAS is three-dimensionally bonded to the silicone-type thermally-polymerizing curable coating so as to form a network structure, as illustrated in FIG. 12. Hence, in the forming method of the Example 6, three alkoxyl groups are hydrolyzed and condensed to form a resin structure so that the FAS oligomer can be closely packed, thus leading to —$(CF_2)_7CF_3$ a becoming easily exposed on the surface.

Figure 13:
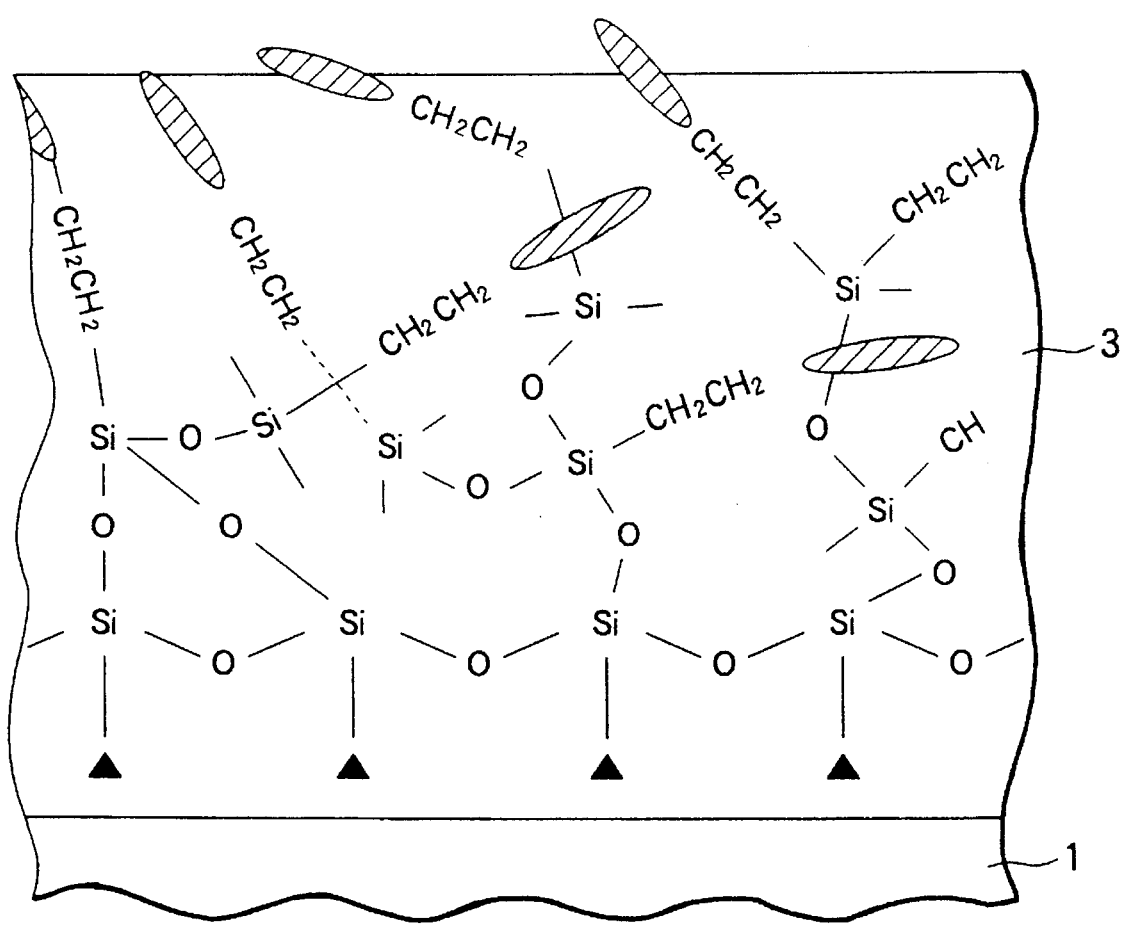
FIG. 13 is a schematic sectional view of the water-repellent and abrasion-resistant thin film obtained in Example 6.

The thus-obtained water-repellent and abrasion-resistant thin film 3 was constructed such that the FAS produced by the network-structured siloxane bonding was present both the surface and interior of the film 3, as illustrated in FIG. 13.

Example 7

In this example, a silane coupling agent including long-chained alkyl groups expressed by the chemical formula: $CH_3(CH_2)_7Si(OCH_2CH_3)_3$ (Nippon Unicar Co., Ltd.: A-137) was used in place of the FAS. The other constructions were the same as those of Example 5.

Test 5

In this test, measurements were made on the contact angle of the water-repellent and abrasion-resistant thin films 3 and 6 immediately after they were formed according to the forming methods of Examples 4 of 7 under the following conditions: 15 parts by weight of the silicone-type thermally-polymerizing curable coating solution and 3 parts by weight of either or the FAS or the FAS oligomer were added to 100 parts by weight of the acrylic-type UV-polymerizing curable coating solution.

Measurements were also made on Comparative Example 3 consisting only of inorganic glass, Comparative Example 4 consisting only of PC, Comparative Example 5 consisting of a methacrylic resin substrate (Rohm and Haas (PMMA)) formed only of PMMA, Comparative Example 6 consisting of an acrylic-type UV-polymerizing curable coating solution, Comparative Example 7 consisting only of a silicone-type thermally-polymerizing curable coating solution and Comparative Example 8 obtained by applying commercially-available Superrane X to a thin film consisting only of a silicone-type thermally-polymerizing curable coating. The results are shown in Table 5.

TABLE 5

|  | Example | | | |
| --- | --- | --- | --- | --- |
|  | 4 | 5 | 6 | 7 |
| Contact angle (°) | 91 | 91 | 98 | 80 |
|  | Comparative Example | | | | | |
|  | 3 | 4 | 5 | 6 | 7 | 8 |
| Contact angle (°) | 30 | 75 | 75 | 60 | 82 | 100 |

In Examples 4 and 6, the contact angles of the uncured layers 3 and 6 before the second polymerization curing step was performed were approximately 84°.

Table 5 indicates that the water-repellent and abrasion-resistant thin films 3 and 6 formed on the resin substrate 1 according to the forming methods of Examples 4 to 7 had a low-surface-free-energy, thus exhibiting excellent water repellency.

Therefore, by using the forming methods of Examples 4 to 7, it is understood that it is possible to form water-repellent and abrasion-resistant thin films 3 and 6 reliably exhibiting excellent water repellency and abrasion resistance on the resin substrate 1. In particular, it is clearly seen that the forming method of Example 6 makes it possible to form the water-repellent and abrasion-resistant thin film 3 exhibiting even better water repellency.

Test 6

A hot-water test at 80° C. for 100 hours was performed on the water-repellent and abrasion-resistant thin films 3 and 6 immediately after formation according to the forming methods of Examples 4 to 7. An adhesion test was then performed.

The adhesion test was performed by the following process. The thin film 6 having underwent the hot-water test was cut with a cutter knife to form squares. Adhesive tape was attached to the squares and then peeled away. An evaluation was made on the adhesion of the thin films depending on whether the squares came off together with the tape.

The evaluation indicated that the thin films 3 and 6 of Examples 4 to 7 did not peel off whatsoever. This may be because the superior water repellency on the surface and interior of the thin films 3 and 6 inhibited water penetration.

Hence, by using of the forming methods of Examples 4 to 7, it is possible to form water-repellent and abrasion-resistant thin films 3 and 6 having adhesion sufficient enough to inhibit to peeling even after a hot-water test.

Test 7

In this test, an evaluation was made on the abrasion resistance of the thin films 3 and 6 soon after formation according to the forming methods of Examples 4 to 7. The 500-cycle Taber abrasion test was performed according to ASTMD1044 whereby increases in Haze values (ΔH(%)) were examined. The same measurements were also made on the above-described Comparative Examples 3 to 7. The results are shown in Table 6.

TABLE 6

| | Example | | | |
|---|---|---|---|---|
| | 4 | 5 | 6 | 7 |
| ΔH (%) | 10.3 | 10.3 | 10.3 | 10.3 |

| | Comparative Example | | | | |
|---|---|---|---|---|---|
| | 3 | 4 | 5 | 6 | 7 |
| ΔH (%) | 0.9 | 38 | 33 | 25 | 55 |

Table 6 shows that the thin films 3 and 6 formed by the methods of Examples 4 to 7 have good water repellency, and also still exhibit excellent abrasion resistance.

It has thus been confirmed that by employing the forming methods of Examples 4 to 7, it is possible to form water-repellent abrasion-resistant thin films 3 and 6 reliably exhibiting both good water repellency and excellent abrasion resistance on the resin substrate 1.

Although Examples 4 to 7, the organic photopolymerizing curable composition was used as the organic polymerizing curable composition, an organic electron-beam polymerizing curable composition may also be employed.

Example 8

Figure 14:
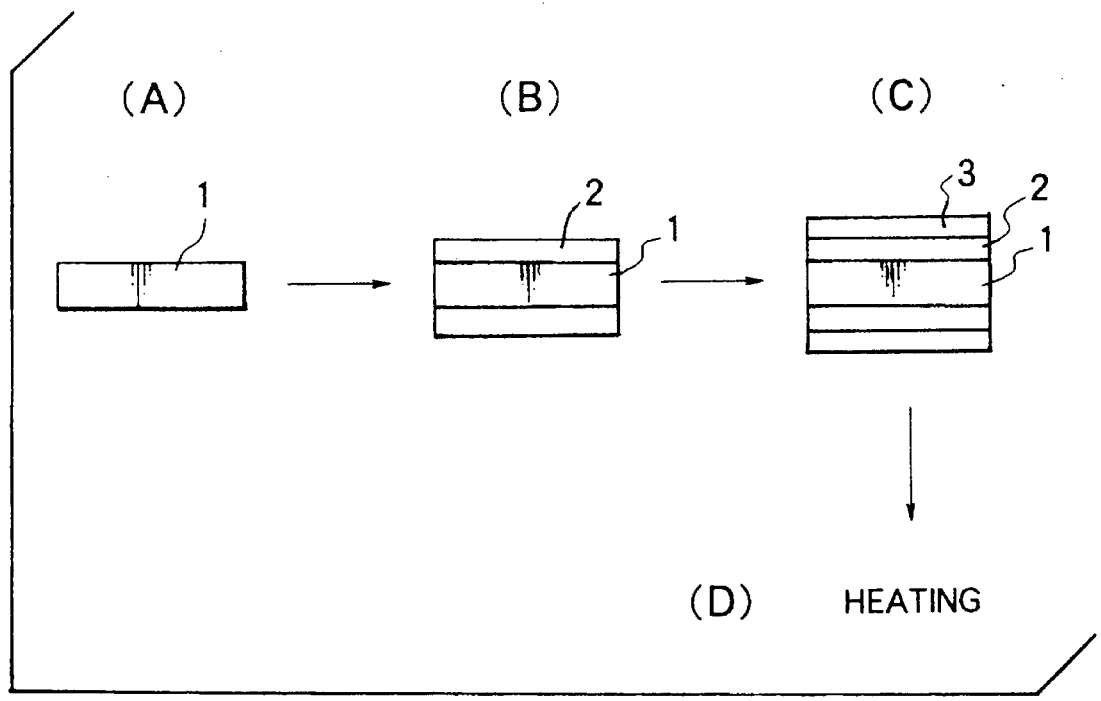
FIG. 14 is a schematic process diagram showing the method according to Examples 8 and FIG. 15 is a schematic process diagram showing the method according to Examples 9, 10 and 12.

As illustrated in FIG. 14(A), a plate (100×100×4(mm)) formed of a polymethyl methacrylate resin (Rohm and Haas (PMMA): brand name KAMAXT-240) was used as resin substrate 1. The resin substrate 1 was annealed at 110° C. for 3 hours, and then kept in a desiccator. It was then removed from the desiccator and immersed in a lens degreaser (Henkel Hakusui: brand name Million HS) aqueous solution for 3 minutes. Subsequently, the resin substrate 1 was cleaned two times with water and one time with purified water. The resultant resin substrate 1 was immersed in isopropanol (IPA) for one minute, and then dried by a dryer.

As shown in FIG. 14(B), a primer liquid consisting of a thermosetting acrylic resin was applied to the dried resin substrate 1 and thermally cured, thereby forming primer layers 2 on both sides of the substrate 1. The thickness of the primer layers 2 should be controlled to fall within a range of from $0.5 \times 10^4$ Å to $2 \times 10^4$ Å.

Uncured layer forming step

Next, FAS (Shin Etsu Chemical Co., Ltd.: KBM-7803 having a molecular weight of 568 and a specific gravity of 1.53) was added at room temperature to a silicone-type thermally-polymerizing curable coating solution (Nippon Dacron Shamrock: Sol Guard NP-730) which had been loaded into a dipping basin, and then stirred, thus preparing a hard coat liquid. The amount of the FAS added to 100 parts by weight of the silicone-type thermally-polymerizing curable coating solution calculated in terms of solids was 1 to 10 parts.

The resin substrate 1 having the primer layers 2 formed thereon was dipped in the hard coat liquid for 30 seconds and then removed at a speed of from 7.2 m to 28 m per second. The example was then dried with infrared rays for from 3 to 5 minutes at from 60° to 80° C. so that any unnecessary solvent was removed. Thus, as shown in FIG. 14(C), uncured layers 3 were formed on both sides of resin substrate 1 through the intermediation of primer layers 2 from the silicone-type thermally-polymerizing curable coating solution and the FAS. The speed for removing substrate 1 from the liquid subsequent to dipping should be controlled so that the thickness of the uncured layers 3 falls within a range from $2 \times 10^4$ Å to $3 \times 10^4$ Å.

Polymerization curing step

Thereafter, as illustrated in FIG. 14(D), the resin substrate 1 having the uncured layers 3 thereon was thermally treated at from 100° to 120° C. for from 60 to 90 minutes. The uncured layers 3 were thus almost polymerized and substantially completely cured, resulting in water-repellent abrasion-resistant thin films 3.

Example 9

Figure 15:
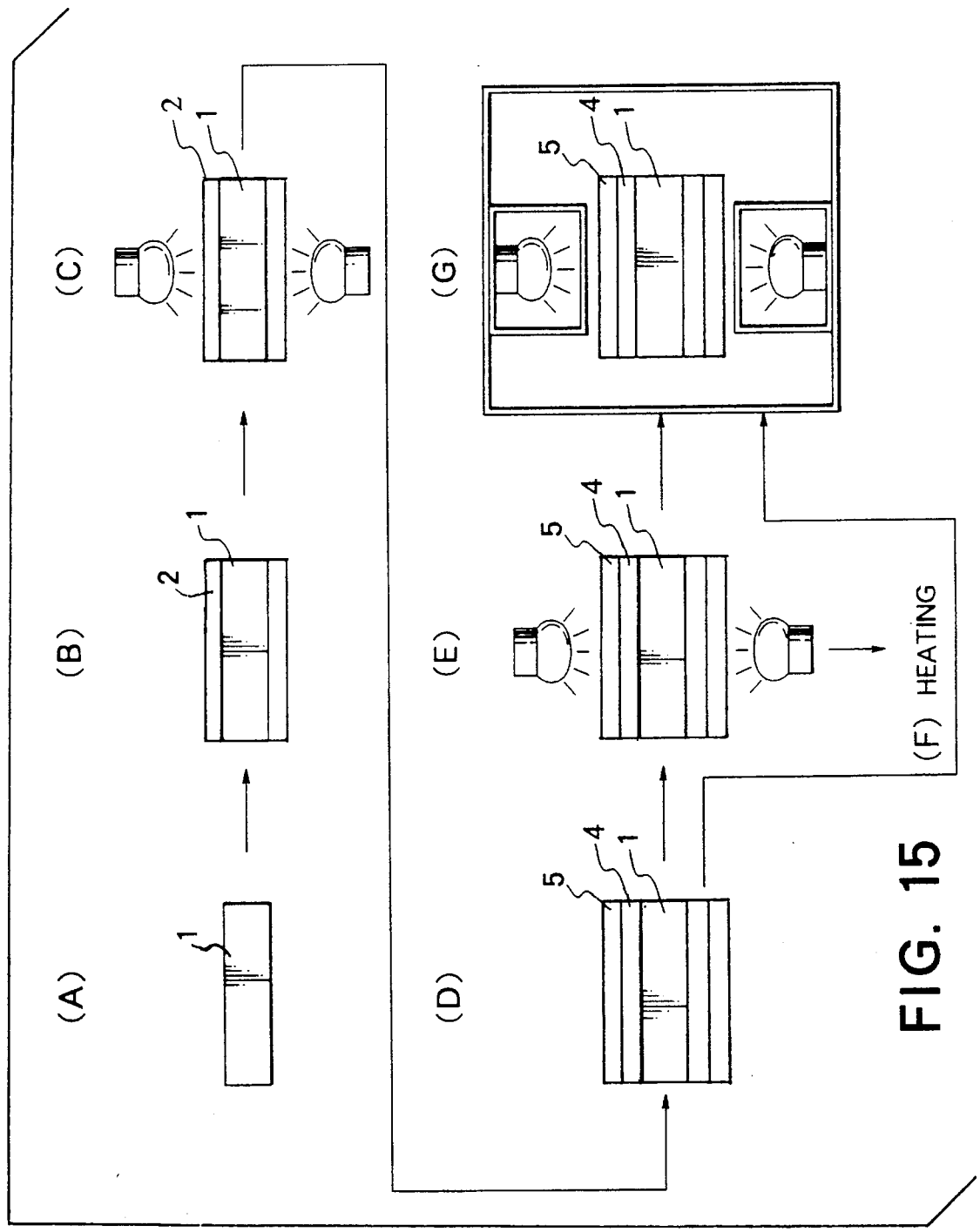

As shown in FIG. 15(A), a dried resin substrate 1 was prepared in the same manner as that of Example 8.

Uncured under layer forming step

A micromolecular coupling agent having methoxy and epoxy groups (Nippon Unicar Co., Ltd.: MMCA) used as a polysiloxane composition having silanol groups was added at room temperature to an acrylic-type UV-polymerizing curable coating solution (Dainichiseika Color & Chemicals Mfg. Co., Ltd.: Seika Beam DP-10) which had been preloaded in a dipping basin, and then stirred, thus preparing an under hardcoat liquid. During this step, the micromolecular coupling agent was first treated with $H_2O$ having a PH of 4.2 thereby removing any methanol from the methoxy groups contained in the agent. Then, 1 to 10 parts by weight of the micromolecular coupling agent were added to 100 parts by weight of the acrylic-type UV-polymerizing curable coating solution calculated in terms of solids.

The dried resin substrate 1 was dipped in the under hardcoat liquid for 30 seconds and then removed at a speed of from 7.2 to 28 m per second. Thereafter, the substrate 1 was dried with infrared rays at from 60° to 80° C. for from 3 to 5 minutes to remove any unnecessary solvent. As illustrated in FIG. 15(B), uncured under layers 4 were thus formed on both sides of the substrate 1. The speed of removing the substrate from the liquid subsequent to dipping was controlled so that the thickness of the uncured under layers 4 would fall within a range of from $4 \times 10^4$ Å to $5 \times 10^4$ Å. Because the acrylic-type UV-polymerizing curable coating solution is organic type, during the under layer forming step, the silanol groups contained in the micromolecular coupling agent were positioned on the outer surfaces of the layers 4, while the epoxy groups were positioned inside the uncured under layers 4 so as to ensure good compatibility.

Under layer polymerization curing step

Thereafter, as shown in FIG. 15(C), the resin substrate 1 with the uncured under layers 2 which had the unnecessary solvent removed therefrom was placed in an irradiation furnace comprising two lamps (80 W/cm) so as to be irradiated with ultraviolet rays at a speed of 2 m per minute. This caused the acrylic-type UV-polymerizing curable component contained in the uncured under layers 4 to undergo radical-polymerization. The uncured tinder layers 4 were thus partially polymerized.

Uncured top layer forming step

The hardcoat liquid of Example 8 was used as the top hardcoat. The resin substrate 1 with partially-cured under layers 4 was dipped in the top hardcoat liquid for 30 seconds, and then removed at a speed of from 7.2 to 28 m per second. Next, the substrate 1 was dried with infrared rays at from 60° to 80° C. for from 3 to 5 minutes removed any unnecessary solvent. As shown in FIG. 15(D), uncured top layers 5 were thus formed on the respective partially-cured under layers 4 through the intermediate of the silanol groups. The speed of removing the resin substrate 1 from the liquid subsequent to dipping should be controlled so that the thickness of the uncured top layers 5 fall within a range of from $2\times10^4$ Å to $3\times10^4$ Å.

In the above-described step, it was easy to form the uncured top layers 5 since the under layers 4 had been partially cured.

Under layer polymerization curing step

As illustrated in FIG. 15(E), the resin substrate having the partially-cured under layers 4 and the uncured top layers 5, both of which had solvents removed therefrom, was once again placed in the irradiation furnace comprising two lamps (80 W/cm) so as to be irradiated with UV at a speed of from 0.75 to 3 m per minute.

This caused the acrylic-type UV-polymerizing curable coating solution to undergo radical-polymerization.

Having been irradiated with UV rays, the partially-cured under layers 4 were almost completely polymerized and cured, resulting in the formation of cured under layers 4. The above-described under layer polymerization curing step may be omitted depending to the degree in which the under layers 4 were irradiated with UV rays.

Top layer polymerization curing step

As illustrated in FIG. 15(F), the resin substrate 1 having the under layers 4 and the uncured top layers 5 was thermally treated at from 100° to 120° C. for from 60 to 90 minutes. The uncured layers 5 were thus almost completely polymerized and cured, resulting in the cured top layers 5.

Figure 8:
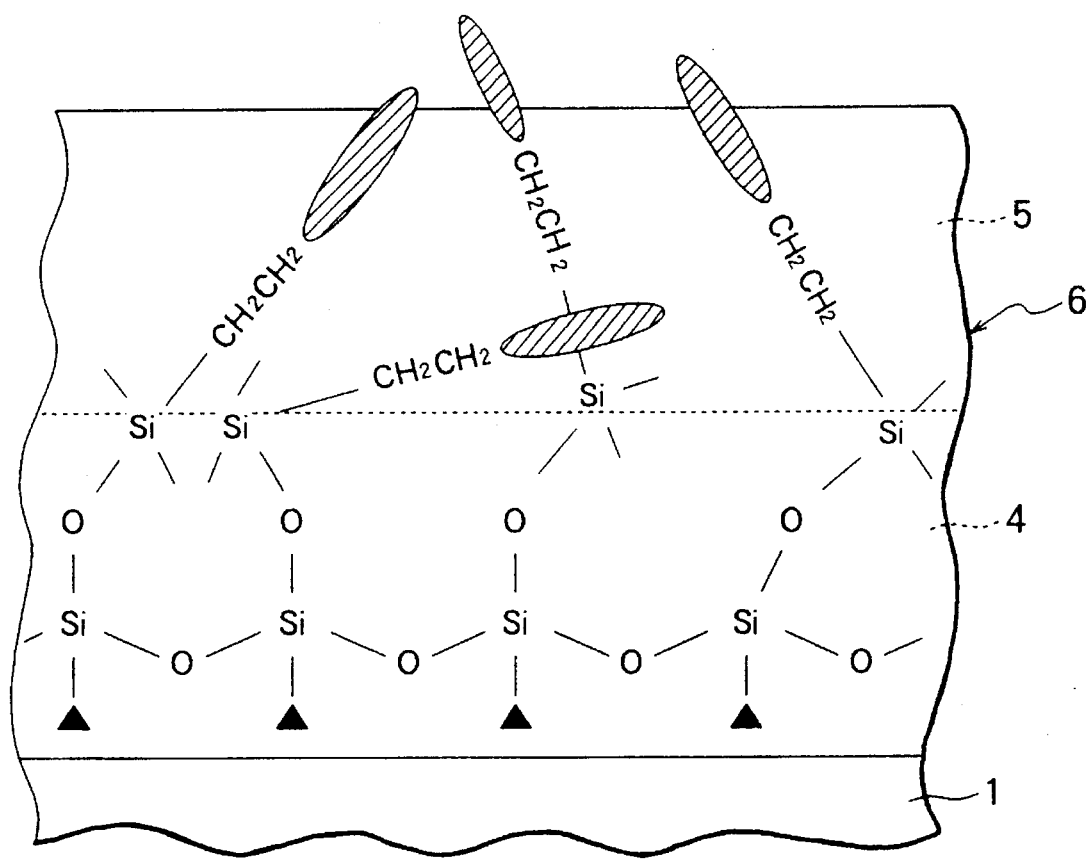
FIG. 8 is a schematic sectional view of the water-repellent and abrasion-resistant thin film obtained in Example 5.

During the above-described curing steps, as shown in FIGS. 5 and 8, siloxane bonding was produced between the silicone-type thermally-polymerizing curable coating and the FAS in the uncured layers 5. Also as indicated by ▲ in FIG. 8, in the interface between the uncured top layer 5 and the under layer 4, the silanol groups contained in the micromolecular coupling agent which underwent the methanol-removing reaction were reacted with —$OCH_3$ groups contained in the FAS, thus also producing siloxane bonding therebetween, resulting in strong adhesion between the under layer 4 and the top layer 5.

The thus-obtained water-repellent abrasion-resistant thin film 6 was constructed in such a way that the FAS which had closely adhered to the micromolecular coupling agent by siloxane bonding was present on the surface and interior of the top layer 5 and also present in the interface between the top layer 5 and the under layer 4.

Additionally, this thin film 6 was constructed in such a way that the top layer 5 consisting of the silicone-type thermally-polymerizing cured coating was formed on the under layer 4 consisting of the acrylic-type UV-polymerizing cured coating. Hence, the thin film 6 had incremental levels of hardness beginning from the resin substrate 1 through the under layer 4 and up to the top layer 5.

Example 1

In this example, the FAS was previously had been self-condensed. That is, water and n-butanol were added to commercially-available FAS at room temperature and then stirred, thus preparing the condensed FAS. 0.5 parts by weight of water and 500 parts by weight of n-butanol were added to 100 parts by weight of the FAS calculated in terms of solids. The FAS was thus reacted with water and n-butanol, as shown in FIG. 9, and self-condensed to result in a FAS oligomer, as illustrated in FIG. 10.

The FAS oligomer was then added at room temperature to the silicone-type thermally-polymerizing curable coating solution which had been preloaded in a dipping basin, and then stirred, thus resulting in a top hardcoat liquid. The amount of the FAS oligomer added to 100 parts by weight of the silicone-type thermally-polymerizing curable coating solution in terms of solids was 1 to 10 parts by weight. The other constructions were similar to those of Example 9.

It can be assumed that the commercially-available silicone-type thermally-polymerizing curable coating solution merely results from the oligomerization of monomers only by way of condensation. Based on this assumption, if the commercially-available FAS is merely mixed with the commercially-available silicone-type thermally-polymerizing curable coating solution according to the forming method employed in Example 9, it is likely that the FAS will be only linearly bonded to the coating, as illustrated in FIG. 11. As consequence, when the forming method of Example 9 is employed, the FAS of the fluorine coupling agent is drawn into the matrix of the resin during curing, which further inhibits —$(CF_2)_7CF_3$ from being exposed on the surface.

In contrast, according to the forming method of the Example 10, since the FAS oligomer is employed, the FAS is three-dimensionally bonded to the silicone-type thermally-polymerizing-curable coating so as to form a network structure, as illustrated in FIG. 12. Hence, when the forming method of the tenth embodiment is employed, three alkoxyl groups are hydrolyzed and condensed to form a resin structure so that the FAS oligomer can be closely packed, thus leading to urging $(CF_2)_7CF_3$ to being easily exposed on the surface.

The thus-obtained water-repellent abrasion-resistant thin film 6 was constructed such that the FAS which was bonded by the network-structured siloxane bonding was present on the surface and interior of the top layer 5 and in the interface between the under layer 4 and the top layer 5, as illustrated in FIG. 8.

Example 11

In this example, a silane coupling agent having a long-chain alkyl group expressed by the chemical formula: $CH_3(CH_2)_7Si(OCH_2CH_3)_3$ (Nippon Unicar Co., Ltd.: A-137) was used instead of the FAS. The other constructions were the same as those of Example 8.

Example 12

In this example, the same silane coupling agent as that used in Example 11 was employed instead of FAS. The other constructions were the same as those of Example 9.

Test 8

Figure 16:
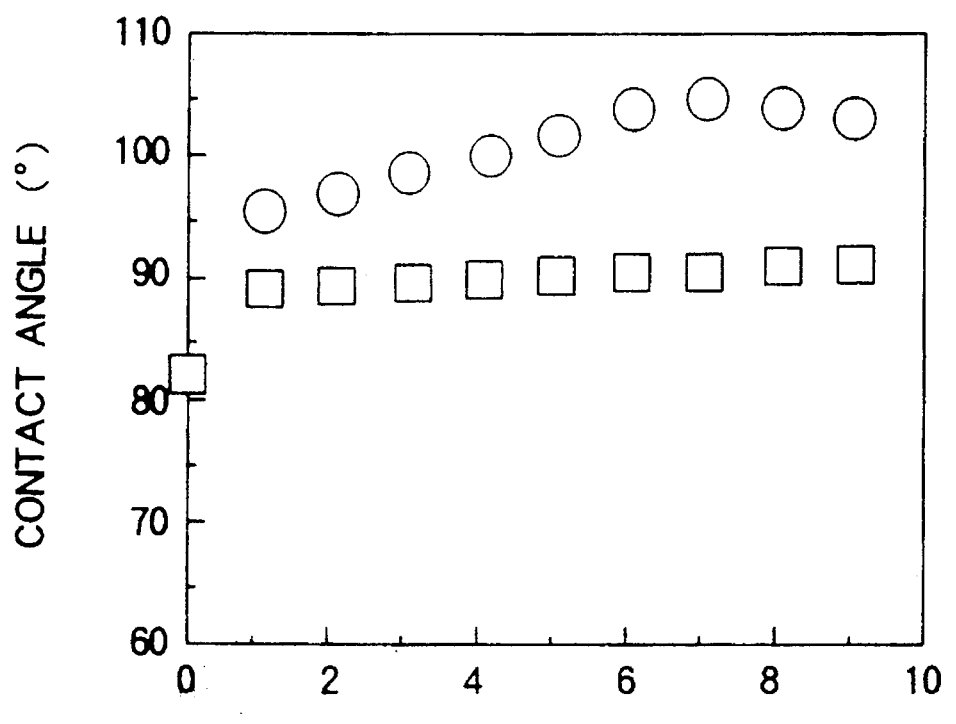
FIG. 16 is a graph showing the relationship between the amount of FAS added and the contact angle in Test 8.

In this test, measurements were made on the contact angle of the water-repellent abrasion-resistant thin films 3 and 6 with water immediately after formation according to the forming methods of Examples 8 to 12. FIG. 16 illustrates the relationship between the contact angle (°) and the amount of FAS or silane coupling agent including the long-chain alkyl group (parts by weight).

Measurements were also made on the contact angle of the water-repellent abrasion-resistant thin films 3 and 6 with water immediately after they had been formed according to the forming methods of Examples 9 and 10 under the condition that the amount of the FAS or FAS oligomer was 3 parts by weight. The results are shown in Table 7.

TABLE 7

|  | Example 9 | Example 10 |
| --- | --- | --- |
| Contact angle (°) | 102 | 107 |

FIG. 16 and Table 7 show that according to the forming methods of Examples 8 and 9, the addition of 6 or more parts by weight of the FAS achieves a contact angle of 103°. It is also seen that according to the forming methods of Examples 11 and 12, the addition of one part or more by weight of the silane coupling agent having a long-chain alkyl group achieves a contact angle of 90°.

Further, it is clear that according to the forming methods of Examples 8 to 12, the water-repellent abrasion-resistant thin films 3 and 6 formed on the resin substrate 1 result in a low-surface-free-energy, thus exhibiting excellent water repellency.

As will be clearly understood from the foregoing description, by employing the forming methods of Examples 8 to 12, it is clearly possible to form water-repellent abrasion-resistant thin films 3 and 6 reliably exhibiting both superior water repellency and abrasion resistance on the resin substrate 1. In particular, the forming method of Example 10 makes it possible to form the thin film 6 exhibiting even more superior water repellency.

Test 9

In this test, a hot-water test at 80° C. for 100 hours was performed on the thin film 6 immediately after it had been formed according to the forming methods of Examples 9 and 10. An abrasion test was then sequentially performed.

The thin film 6 having underwent the hot-water test was cut with a cutter knife to form squares. Adhesive tape was attached to the squares and then peeled off. An evaluation was made on the adhesion of the film 6 depending on whether the squares came off with the adhesive tape.

Evaluations were also made on Comparative Example 9 consisting of an abrasion-resistant thin film obtained by forming a top layer consisting of a silicone-type thermally-polymerizing cured coating without adding FAS thereto on an under layer consisting of an acrylic-type UV-polymerizing cured coating which was formed under the same conditions as those of Example 9.

As a result, the thin film of Comparative Example 9 peeled off. This may be because this thin film had a $SiO_{2-x}$ (x=0.6–0.7) construction on the surface, which is easily penetrated by water causing swelling and thereby weakening the bonding between the under layer and the top layer of the film.

In contrast, the thin films 6 of Examples 9 and 10 did not peel off. This may be because of their excellent water repellency both on the surface and interior of thin film 6 inhibited water penetration thereinto.

As will be clearly understood from the foregoing description, the forming methods of Examples 9 and 10 enable the formation of the water-repellent abrasion-resistant thin film 6 having enough adhesion between the under layer 4 and the top layer 5 that the film 6, having underwent hot-water testing still did not peel off.

Test 10

To evaluate the abrasion resistance of thin films 3 and 6, a 500-cycle Taber abrasion test was performed according to the ASTMD 1044 method immediately after formation according to the forming methods of Examples 8 to 12. Increases in the Haze values ($\Delta H(\%)$) were measured. The results are shown in Table 8.

TABLE 8

|  | Example | | | | |
| --- | --- | --- | --- | --- | --- |
|  | 8 | 9 | 10 | 11 | 12 |
| $\Delta H$ (%) | 7.0 | 2.7 | 2.7 | 7.8 | 3.5 |

Table 8 indicates that the thin films 3 and 6 formed by the forming methods of Examples 8 to 12 have sufficient water repellency, and, also, still have good abrasion resistance.

As will be clearly understood from the foregoing description, by use of the forming methods of Examples 8 to 12, it is possible to form water-repellent abrasion-resistant thin films 3 and 6 reliably exhibiting both excellent water repellency and abrasion resistance on the resin substrate 1.

Although in Examples 9 and 12 the abrasion-resistant photopolymerizing curable composition was employed as the uncured under layers 2 and 4 an abrasion-resistant electron-beam polymerizing curable composition or an abrasion-resistant thermally-polymerizing curable composition may also be used.

What is claimed is:

1. A thin-film forming method comprising:
   an uncured-layer forming step in which a mixed composition containing an organic polymerizing agent curable composition and a silicone polymerizing curable composition is prepared to form an uncured layer consisting of this mixed composition on a resin substrate;
   a solvent removing step in which the solvent in the uncured layer is removed;
   a first polymerization curing step in which the organic polymerizing curable composition in the uncured layer is polymerized; and
   a second polymerization curing step in which the silicone polymerizing curable composition in the uncured layer is polymerized.

2. A thin-film forming method according to claim 1 wherein the mixed composition further contains a silane coupling agent having at least one of the following organic functional groups: methacrylic group, acrylic group, epoxy group, amino group, and vinyl group.

3. A thin-film forming method according to claim 1 wherein the mixed composition further contains a silane coupling agent having a fluoro-alkyl group.

4. A thin-film forming method according to claim 1 wherein the mixed composition further contains a silane coupling agent having a long-chain alkyl group.

5. A water-repellent and abrasion-resistant thin-film forming method comprising:
   an uncured-layer forming step in which a mixed composition containing an organic polymerizing curable composition, a silicone abrasion-resistant thermally curable composition and a silane coupling agent having a fluoro-alkyl group or a long-chain alkyl group having not less than 8 carbon atoms is prepared to form an uncured layer consisting of this mixed composition on a resin substrate;

a solvent removing step in which the solvent in the uncured layer is removed;

a first polymerization curing step in which the organic polymerizing curable composition in the uncured layer is polymerized by irradiation with light or an electron beam; and a second polymerization curing step in which the silicone abrasion-resistant thermally curable composition in the uncured layer is polymerized by heating.

6. A water-repellent and abrasion-resistant thin-film forming method comprising:

an uncured-layer forming step in which a mixed composition containing an organic polymerizing curable composition and a silicone abrasion-resistant thermally curable composition is prepared to form an uncured layer consisting of this mixture composition on a resin substrate;

a solvent removing step in which the solvent in the uncured layer is removed;

a first polymerization curing step in which the organic polymerizing curable composition in the uncured layer is polymerized by irradiation with light or an electron beam;

a water-repellent layer forming step in which a silane coupling agent having a fluoro-alkyl group or a long-chain alkyl group having not less than 8 carbon atoms is applied to the uncured layer after the first polymerization curing step; and a second polymerization curing step in which the silicone-type abrasion-resistant thermally curable composition in the uncured layer is polymerized by heating at a temperature not higher than 120° C.

7. A water-repellent and abrasion-resistant thin-film forming method according to claim 5 wherein the silane coupling agent having a fluoro-alkyl group has undergone self-condensation.

8. A water-repellent and abrasion-resistant thin-film forming method according to claim 6 wherein the silane coupling agent having a fluoro-alkyl group has undergone self-condensation.

* * * * *

UNITED STATES PATENT AND TRADEMARK OFFICE
CERTIFICATE OF CORRECTION

PATENT NO. : 5,571,569
DATED : November 5, 1996
INVENTOR(S) : Kato et al

It is certified that error appears in the above-indentified patent and that said Letters Patent is hereby corrected as shown below:

Column 2, line 21, "Si(CH$_3$)" should read --Si(CH$_3$)$_2$"--; line 37, "199 1" should read --1991--; line 38, "(990)" should read --(1990)--; line 44, after "evaporate" insert comma --,--.

Column 5, line 9, after "4 and" insert --5--; line 32, after "8 and" insert --11--.

Column 6, line 45, "KBM-003" should read --KBM-1003--.

Column 8, line 9, after "other" insert comma --,--.
line 11, "thermal" should read --thermally--;
line 22, delete "and" (second occurrence); line 25 "decrease" should read --decreases--; line 26, "week" should read --weak--.

Column 9, line 26 "20°C" should read --120°C--.

Column 11,
line 28, after "groups" insert comma --,--; line 31, after "1" insert comma --,--; line 34, after "2" insert comma --,--; line 47, after "layers" insert --2--; line 55, after "Thus" insert comma --,--; after "cured" insert comma --,--;

UNITED STATES PATENT AND TRADEMARK OFFICE
CERTIFICATE OF CORRECTION

PATENT NO. : 5,571,569
DATED : November 5, 1996
INVENTOR(S) : Kato et al

It is certified that error appears in the above-indentified patent and that said Letters Patent is hereby corrected as shown below:

Column 14, line 52, after "to the thin film of" insert "Comparative Example 1."; delete line 55.

Column 15, line 38 after "Example" insert --2--.

Column 16, line 27, "7," should read --1,--.

Column 19, line 34, before "becoming" delete "a"; line 54, "4 of 7" should read --4 to 7--.

Column 23, line 9, after "substrate" insert --1--; line 55, "Example 1" should read --Example 10--; line 56, delete "was".

Signed and Sealed this

Twenty-sixth Day of August, 1997

Attest:

BRUCE LEHMAN

Attesting Officer

Commissioner of Patents and Trademarks